(12) United States Patent
Pearce

(10) Patent No.: US 6,234,757 B1
(45) Date of Patent: May 22, 2001

(54) SYSTEM FOR SUSPENDING A CEILING FAN

(75) Inventor: Richard A. Pearce, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/333,616

(22) Filed: Jun. 15, 1999

(51) Int. Cl.$^7$ ................................................. F04D 29/18
(52) U.S. Cl. ........................................... 416/244 R; 416/5
(58) Field of Search ..................... 416/5, 244 R, 416/246, 4; 248/317, 342, 343, 345; 403/22, 115, 116

(56) References Cited

U.S. PATENT DOCUMENTS

| | | | |
|---|---|---|---|
| 2,749,074 | 6/1956 | Bodian | 248/344 |
| 4,245,957 | 1/1981 | Savage et al. | 416/135 |
| 4,555,166 | 11/1985 | Enomoto | 350/634 |
| 4,729,725 | 3/1988 | Markwardt | 417/423 R |
| 4,836,806 | 6/1989 | Dougherty et al. | 439/751 |
| 4,854,562 | 8/1989 | Etienne et al. | 267/292 |
| 4,884,947 | 12/1989 | Rezek | 416/5 |
| 4,936,533 | 6/1990 | Adams et al. | 248/222.1 |
| 5,033,722 | 7/1991 | Lammers | 267/153 |
| 5,090,654 | 2/1992 | Ridings et al. | 248/343 |
| 5,222,864 * | 6/1993 | Pierce | 416/5 |
| 5,232,209 | 8/1993 | de Fontenay | 267/220 |
| 5,256,037 | 10/1993 | Chatelain | 417/423.7 |
| 5,267,805 | 12/1993 | Ueno et al. | 403/134 |
| 5,507,619 | 4/1996 | Ryan | 416/5 |
| 5,613,832 | 3/1997 | Su | 416/244 R |
| 5,641,133 | 6/1997 | Toosi | 244/17.27 |
| 5,651,535 | 7/1997 | David | 267/140.5 |
| 5,659,129 | 8/1997 | Asoyan et al. | 73/54.25 |

* cited by examiner

*Primary Examiner*—Edward K. Look
*Assistant Examiner*—James M. McAleenan
(74) *Attorney, Agent, or Firm*—Baker, Donelson, Bearman & Caldwell

(57) ABSTRACT

A system for suspending a ceiling fan is provided which allows the ceiling fan to pivot, to accommodate vaulted or sloped ceilings, while preventing the ceiling fan from rotating about a longitudinal centerline axis of the fan. The system includes a hollow canopy defining an interior space and having an upper end portion, which is operatively attachable to a support structure such as the ceiling, a lower end portion and a central, body portion extending between the upper and lower end portions. The canopy further includes a seat which is connected to the lower end portion and extending upwardly therefrom. A lobed ball is pivotally engaged with the canopy seat and is connected to a stationary portion of the ceiling fan. In each embodiment, the lobed ball includes at least one radially outwardly extending lobe, defined by the inner and outer surfaces of the ball. In each embodiment, the inner surface of the canopy seat has a shape which is complementary to the shape of the outer surface of the lobed ball. The system may include a hollow sleeve connected to the stationary portion of the ceiling fan, such as an upper end portion of a downrod of the ceiling fan. In this instance, the lobed ball is disposed in surrounding relationship with the hollow sleeve and frictionally engages the sleeve.

44 Claims, 24 Drawing Sheets

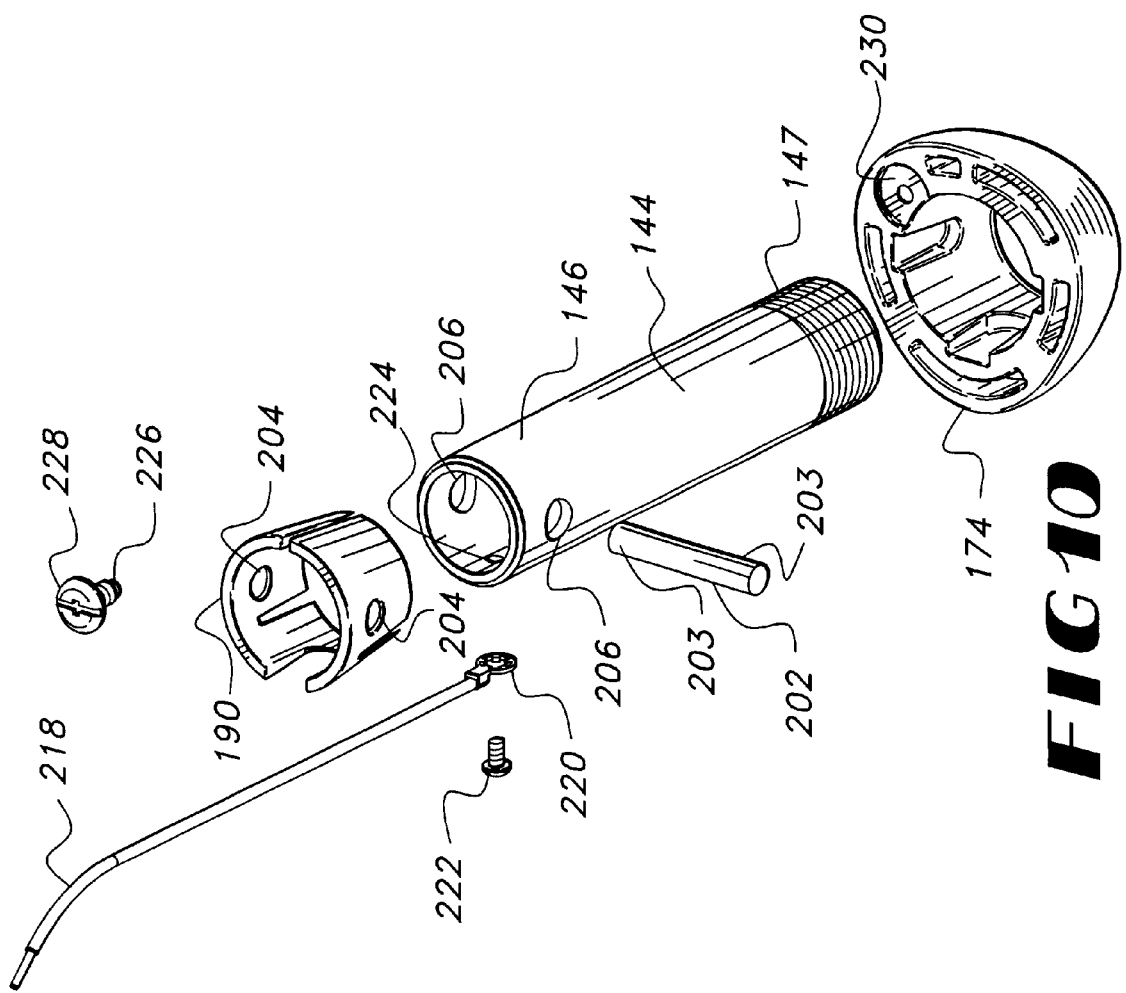
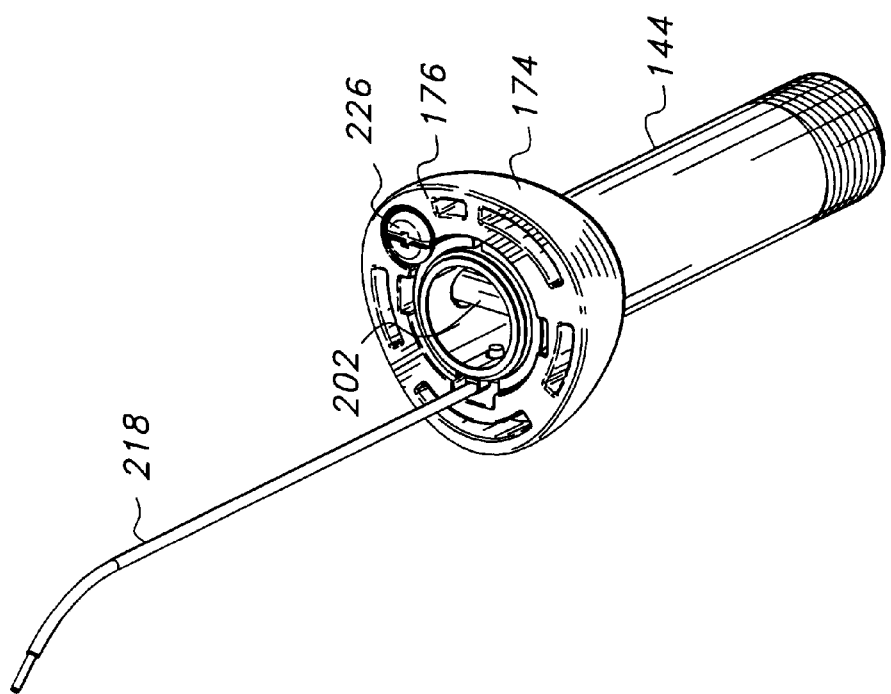

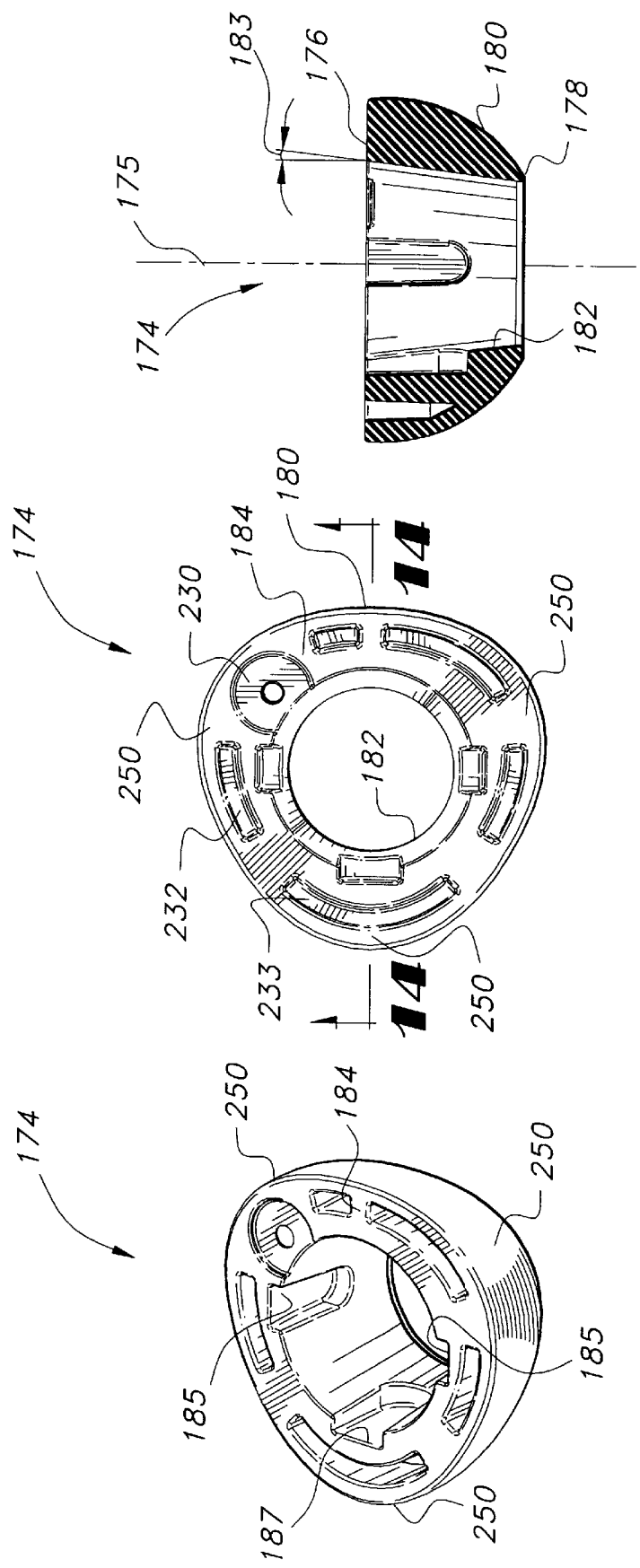

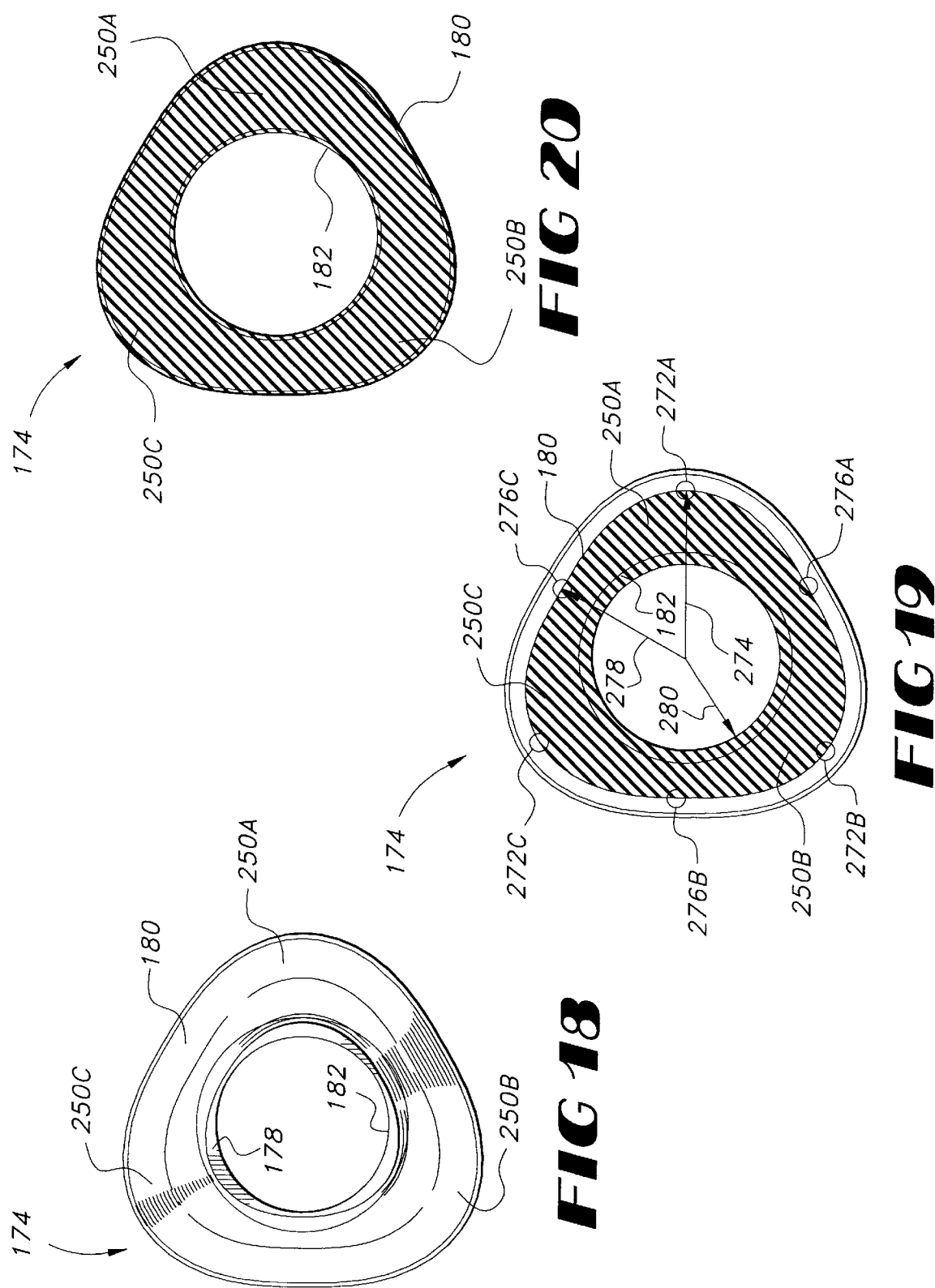

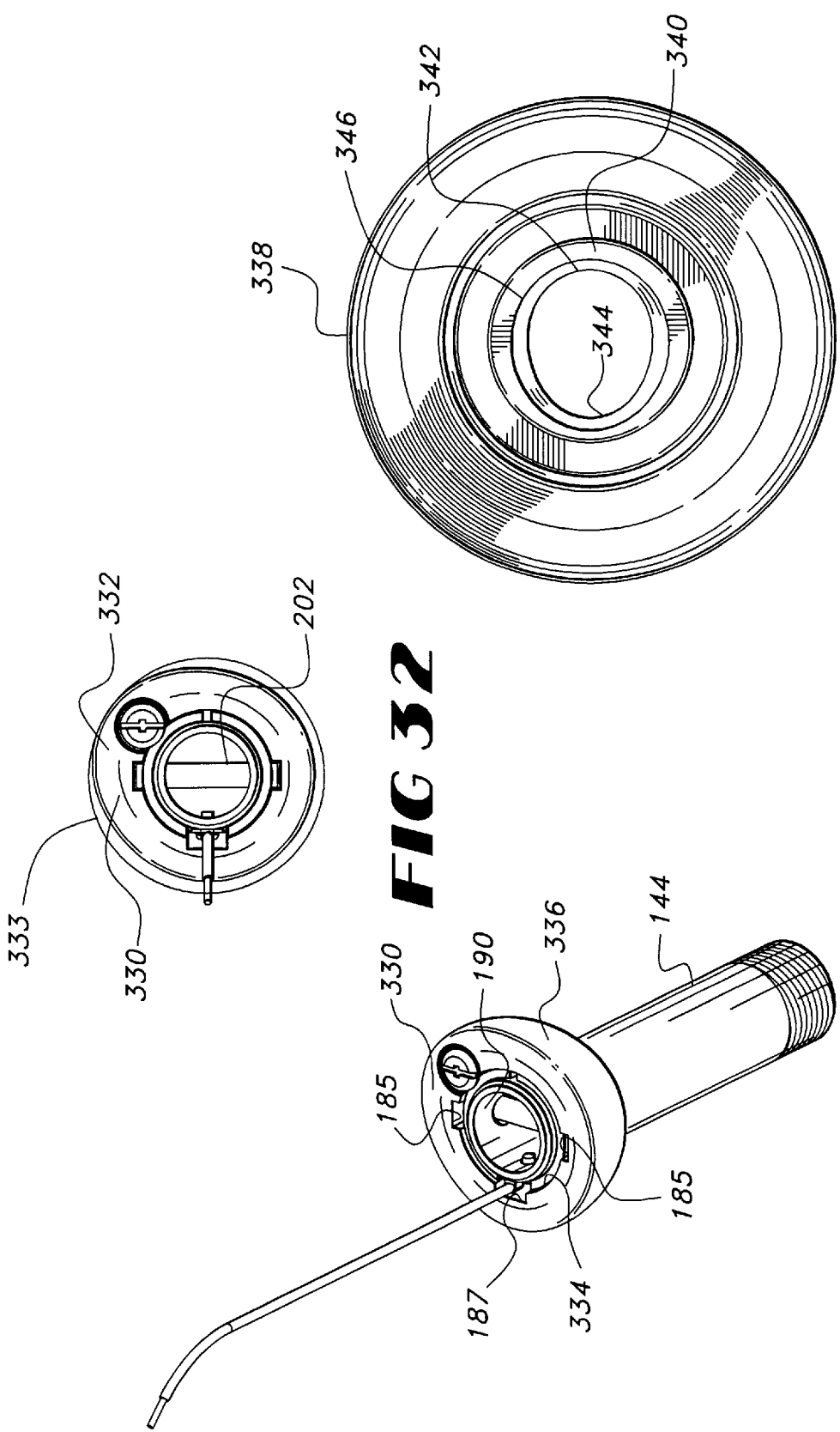

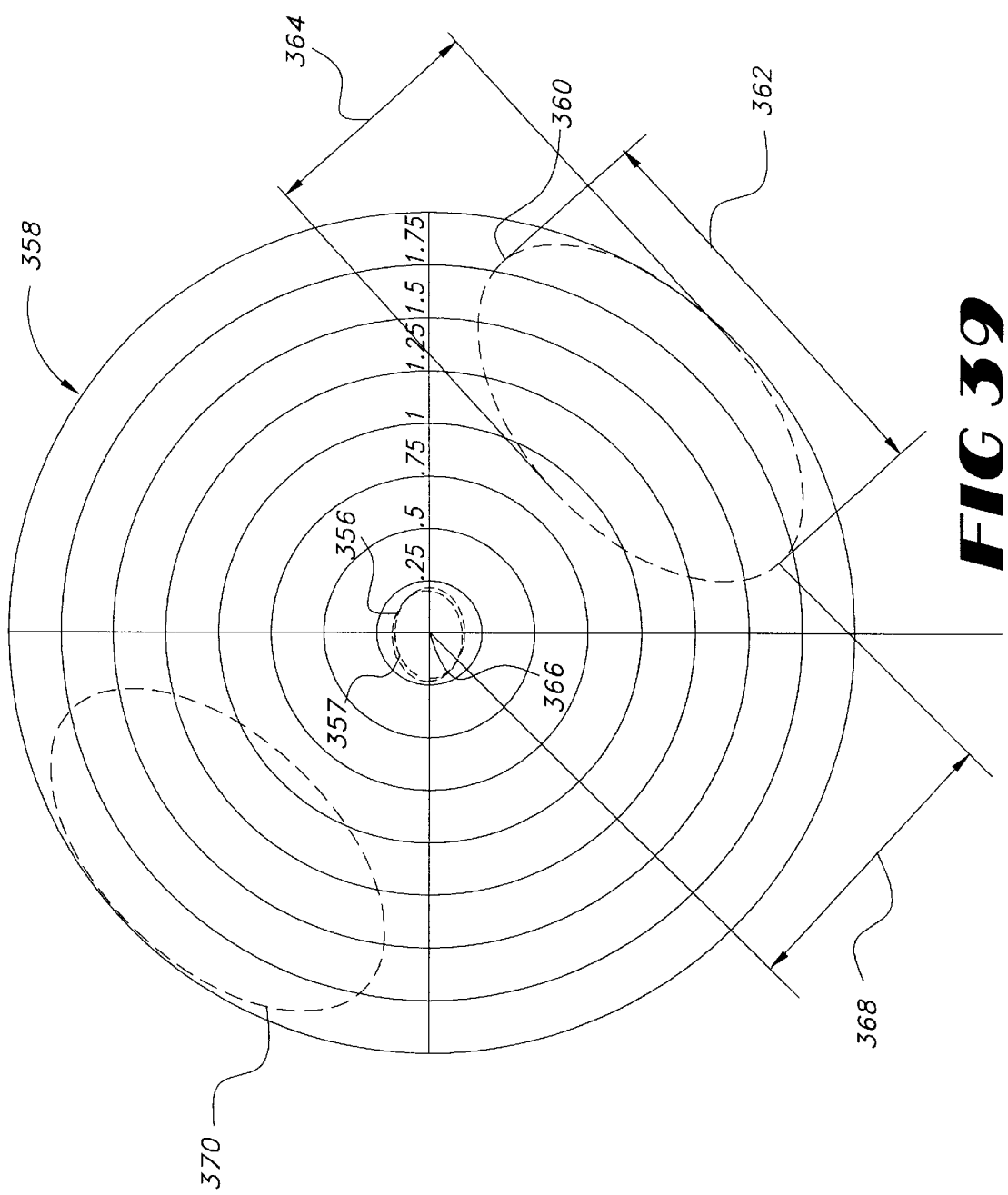

SYSTEM FOR SUSPENDING A CEILING FAN

CROSS REFERENCES

This Application is related to co-pending, commonly assigned and concurrently filed U.S. patent application Ser. No. 09/333,253, entitled "System For Suspending A Ceiling Fan,".

BACKGROUND

1.0 Field of the Invention

The present invention relates generally to ceiling fans and, more particularly, to a system for suspending a ceiling fan.

2.0 Related Art

Ceiling fans have become an increasingly popular supplementary means of conditioning air within both commercial and residential buildings. Notwithstanding the widespread use of ceiling fans, one continuing problem which faces ceiling fan designers is the tendency of ceiling fans to "wobble", or pivot about the point of suspension. Ceiling fan wobble may exist regardless of the type of conventional system used to mount the ceiling fan, due to fan blade imbalance, which may result from a variety of discrepancies associated with the ceiling fan blades including variations in blade pitch angle, dihedral angle, uneven circumferential spacing between adjacent blade pairs, blade warpage and uneven radial spacing of the blades from the vertical axis of rotation. However, ceiling fan wobble is more prevalent in ceiling fans suspended from a ceiling by a canopy and downrod arrangement, as subsequently discussed in greater detail. Ceiling fan wobble and the associated vibration creates undesirable noise, is visually distracting and may adversely affect the service life of the ceiling fan.

The fan blades of ceiling fans must be positioned at a certain optimum distance from the floor to achieve proper air circulation within the room in which they are installed. This may be accomplished in rooms having relatively high or vaulted ceilings by suspending the fan from the ceiling with a system which includes a canopy and downrod/ball assembly. While conventional systems of this type have enjoyed widespread use, they have a tendency to exacerbate the fan wobble problem as subsequently discussed in conjunction with FIGS. 1–7.

FIG. 1 is a fragmentary elevation view, partially in cross-section, illustrating a portion of a ceiling fan 10 and a conventional system 12 for suspending fan 10 from a ceiling (not shown). Ceiling fan 10 includes a motor (not shown) and a plurality of fan blades (not shown) connected to a rotatable portion of the motor, typically by blade irons (not shown). Ceiling fan 10 further includes a motor housing 14, which may have a unique configuration or decorative outer surface. The ceiling fan 10 typically includes a switch housing suspended below the motor housing 14 and may optionally include a light fixture. A stationary portion of the motor, such as the stator shaft (not shown) may be connected to the motor housing via an adapter 16, with the upper portion of adapter 16 being shown in FIG. 1. Adapter 16 is connected to the suspension system 12, for supporting the ceiling fan 10.

The suspension system 12 includes a hollow canopy 18 having an upper end portion 20 which is effective for mounting the ceiling fan directly to the ceiling or to an electrical junction box disposed above the ceiling. With regard to canopy 18, the upper end portion comprises an annular flange which may be attached to the ceiling or junction box via brackets (not shown). The suspension system 12 further includes a downrod 22 having a lower end which is attached to the adapter 16, typically by threading the lower end of the downrod 22 into adapter 16. The suspension system 12 further includes a ball 24 disposed in surrounding relationship with an upper end of the downrod 22 and connected thereto by a fastener, such as a set screw (not shown) extending radially through an annular wall of ball 24 into engagement with the downrod 22.

Canopy 18 defines an interior space 28 and includes a seat 30 extending upwardly from a lower end 32 of canopy 18 and defining an aperture 34 formed in the lower end 32. Seat 30 is discontinuous in a circumferential direction as subsequently explained further. The ball 24 is disposed partially within the interior space 28 defined by canopy 18, with a spherical outer surface 26 of ball 24 engaging an arcuate inner surface of the seat 30. As shown in FIG. 1, a portion of ball 24 extends through the aperture 34 and protrudes below the lower end 32 of canopy 18. The suspension system 12 further includes a pin 36 which extends through apertures 37 formed in the upper end of the downrod 22 and includes opposing ends 38, 40 which are disposed in longitudinally extending slots 42 formed in the ball 24. This permits the vertical suspension loads of the ceiling fan 10 to be reacted through the downrod 22, pin 36 and ball 24 to the canopy 18.

The spherical outer surface 26 of the ball 24 and the arcuate inner surface of the seat 30 of canopy 18 permits the ball 24 to pivot within seat 30 of canopy 18. Accordingly, the ceiling fan may pivot about the center of rotation of ball 24, corresponding to the center (indicated at G in FIGS. 3, 4, 5 and 7) of the spherical radius defining the outer surface of the ball 24. The foregoing pivoting of ball 24 and resultant pivoting of the ceiling fan 10, is necessary for the following reasons. In the first instance, ball 24 must be free to pivot when ceiling fan 10 is mounted to a vaulted, or sloped ceiling. In this instance, the design intent is that a longitudinal centerline axis 54 of the ceiling fan 10 remains substantially vertically disposed. Another reason for requiring the ball 24 to pivot within seat 30 of canopy 32, is to accommodate wobble of ceiling fan 10 due to an imbalance of the fan blades or rotating portion of the motor. Rigidly mounting the ceiling fan 10 to the ceiling (i.e., eliminating the pivoting motion of ball 24 within seat 30) would result in damage to the ceiling as a result of the ceiling fan wobble which typically occurs.

The canopy 18 further includes a radially extending tab 50 which engages a longitudinally extending slot 52 formed in the outer surface 26 of the ball 24. The tab 50 is located circumferentially at a position where the seat 30 of canopy 18 is discontinuous. Furthermore, as shown in FIG. 2, the tab 50 extends radially outward from the bottom end 32 of canopy 18. It is important to note that when the ceiling fan is at rest, with the ball 24 engaged in seat 30 of canopy 18 as shown in FIG. 1, the tab 50 of canopy 18 engages the slot 52 of ball 24 at a position which is below the center G of the spherical radius defining the outer surface of the ball 24. This causes the ball 24 to pivot about an axis which does not pass through the center G as subsequently discussed.

The engagement of the tab 50 in slot 52 of ball 24 reacts the rotational torque created by the motor of the ceiling fan 10 and prevents the ball 24 from rotating within seat 30 about a longitudinal centerline axis 54 of the fan 10. Accordingly, the ceiling fan 10 is prevented from rotating about the longitudinal centerline axis 54 of the ceiling fan 10. This prevents the electrical wires (not shown) which pass upward through the hollow interior of the downrod 22 to the junction box, from becoming entangled. However, the local pinning of the ball 24, via tab 50 in slot 52, causes the ball 24 to pivot within seat 30, in reaction to the motor torque, so that the centerline axis 54 is canted relative to vertical, during operation of the ceiling fan 10. Furthermore, the inventor has determined that as the ball 24 pivots within seat 30 of canopy 18 an undesirable rotation (less than one revolution) of the ball 24 and downrod 22 occurs in reaction to the motor torque. This motion is superimposed on the generally circular motion created by imbalances in the fan blades or other rotating components, which normally occurs. The partial rotation of the ball 24 and downrod 22, in reaction to the motor torque, exacerbates the ceiling fan wobble problem as further discussed in conjunction with FIGS. 3–7. Furthermore, it is believed that the partial rotation of the ball 24 and downrod 22 in reaction to the motor torque, creates a magnified, elliptical wobble pattern, which has been observed with ceiling fans having the type of suspension system discussed previously, rather than a circular fan wobble pattern.

When the ceiling fan 10 is energized, a rotational torque is applied to the ball 24 through the downrod 22. This rotational torque tends to rotate the ball 24 within seat 30 of canopy 32 about the center G of the spherical radius defining the outer surface of ball 24. However, since the ball is pinned at one location, by the engagement of tab 50 in slot 52, a secondary pivot point is established. As a result, the ball 24 pivots about an axis EF (shown in FIGS. 3,5 and 7) which passes through the center G of the spherical radius of the ball 24 and the location, indicated generally at H, where the tab 50 engages slot 52. This causes the centerline axis 54 of the ceiling fan 10 (which passes through the center of the downrod 22) to be canted, or disposed at an angle relative to vertical, during operation of the ceiling fan 10.

FIGS. 3–7 are provided in an attempt to further illustrate the complex motion of the ball 24, within the canopy seat 30, and the downrod 22 attached to the ball 24. As shown in FIG. 3, axis EF is oriented at an acute angle 55 relative to a horizontal axis 58 passing through the center G of the spherical radius defining the outer surface of ball 24. Axis EF is not perpendicular to the centerline axis 54 of the fan 10, but instead is disposed at an acute angle 60 from axis 54. Furthermore, the axis EF remains stationary as the ball 24 and downrod 22 move. Accordingly, the angle between axis EF and centerline 54 changes as the ball 24 and downrod 22 move. The inventor has determined that this orientation of axis EF relative to the centerline axis 54 of fan 10 is the reason that fan 10 becomes canted relative to vertical during operation.

A plane ABCD is illustrated in FIGS. 4–7 which passes longitudinally through the center of downrod 22 and intersects the axis EF passing between points G and H. In FIG. 6, plane ABCD is substantially vertically disposed and intersects an outer surface of the downrod 22 at points I and J which are horizontally aligned with one another. Ball 24 and downrod 22 may describe a first motion within plane ABCD as shown by direction arrow 56 in FIG. 4. Also, as discussed previously, the ball 24 and downrod 22 may pivot about the axis EF. When the ball 24 and downrod 22 are pivoted about axis EF to the position shown in FIGS. 4 and 5 points I and J on downrod 22 are displaced horizontally from one another by a distance X, as shown in FIG. 5. This displacement of points I and J is equivalent to that which would occur if the downrod 22 were rotated counterclockwise, as viewed from a position below fan 10, about the longitudinal centerline axis 54 of fan 10. When the ball 24 and downrod 22 are moved to the position shown in FIG. 7, it may be seen that points I and J on downrod 22 are displaced by a horizontal distance Y, which is equivalent to that which would occur if the downrod 22 were rotated in a clockwise direction, as viewed from a position below fan 10, about the longitudinal centerline axis 54 of the ceiling fan 10. The inventor has deduced that conversely, an attempt to rotate the downrod 22 and ball 24 about the longitudinal centerline axis 54 of fan 10, such as that caused by the application of the rotational torque of the motor of fan 10, causes the downrod 22 and ball 24 to pivot about axis EF such that the longitudinal axis 54 is canted or angled relative to vertical during the operation of fan 10. The inventor has observed that with conventional ceiling fans employing a suspension system such as that described with respect to FIGS. 1–7, the centerline of the ceiling fan, such as centerline 54, is in fact angled relative to vertical during operation of the fan resulting in an undesirable appearance. Furthermore, the circular motion created by any imbalance in the rotating parts of the ceiling fan, such as the fan blades, adds to and subtracts from the motion created by the torque of the ceiling fan motor such that the ceiling fan jerks during operation and describes an elliptical fan wobble pattern. The inventor has further determined that the magnitude of the angle that the centerline of the ceiling fan is displaced relative to vertical, increases as the motor torque increases. Since the current trend is to provide ceiling fans with increased motor torque, so as to produce an increase in the amount of air circulated by the fan, as measured in cfm, the foregoing problems associated with conventional ceiling fan suspension systems, represents an ever-increasing problem for ceiling fan designers.

Another problem associated with the use of conventional ceiling fan suspension systems of the type illustrated in FIGS. 1–7, is related to the use of the set screw, discussed previously, to attach the pivoting ball 24 to the downrod 22. The set screw tends to cause the downrod 22 to be off center relative to ball 24 somewhat, resulting in the centerline 54 of fan 10 to be canted related to vertical. Furthermore, if the set screw is improperly assembled, such that the downrod 22 is free to pivot somewhat relative to the ball 24, the ceiling fan wobble problem is exacerbated.

In view of the foregoing deficiencies with known systems for suspending ceiling fans, there remains a need for an improved system which alleviates ceiling fan wobble.

SUMMARY

In view of the foregoing needs, the present invention is directed to a system for suspending a ceiling fan having a longitudinal centerline axis, a motor having a rotor and a stator, and a plurality of fan blades connected to the rotor. Testing has demonstrated that the system for suspending a ceiling fan according to the present invention results in dramatic improvements in ceiling fan wobble. In the first instance, the longitudinal centerline axis of the ceiling fan is not canted due to the operational torque of the ceiling fan motor, unlike conventional ceiling fan suspension systems used previously. Accordingly, the longitudinal centerline of the ceiling fan may remain in a vertical plane during operation of the ceiling fan. It should be understood that this is true with substantially even, flat ceilings, those which have some unevenness, or with vaulted ceilings. With uneven or vaulted ceilings, elements of the suspension system may pivot relative to one another to accommodate the uneven ceiling or the vaulted or angled ceiling, as subsequently discussed, but the ceiling fan remains in a vertical plane. Furthermore, the use of the suspension system of the present invention results in a ceiling fan wobble pattern having a circular shape which is significantly reduced in magnitude relative to the elliptical wobble pattern resulting from the use of conventional ceiling fan suspension systems. The dramatic reduction in ceiling fan wobble which may be accomplished by using the ceiling fan suspension system of the present invention results in significant increase in the service life of the ceiling fan.

According to one embodiment, the system for suspending a ceiling fan according to the present invention includes a hollow canopy which defines an interior space and includes an upper end portion which is operatively attachable to a support structure. The canopy further includes a lower end portion having a bottom surface and a seat connected to the lower end portion and extending upwardly from the lower end portion within the interior space. The seat has upper and lower ends, an outer surface, and a shaped inner surface defining an aperture extending through the seat and the bottom surface of the canopy. The system further comprises a ball pivotally engaged with the canopy seat and corrected to a stationary portion of the ceiling fan for the purpose of suspending the ceiling fan. The ball includes upper and lower ends, and inner and outer surfaces which define an annular wall extending between the upper and lower ends. The inner surface of the ball is connected to the stationary portion of the ceiling fan, while the outer surface engages the inner surface of the canopy seat.

An important feature of the ceiling fan suspension system of the present invention is that the outer surface of the ball has a shape which is complementary to the shape of the inner surface of the canopy seat, with the outer surface of the ball and the inner surface of the seat interacting with one another to allow the ceiling fan to pivot about an axis passing through the center of rotation of the ball while preventing the ceiling fan from rotating about the longitudinal centerline axis of the ceiling fan. The axis passing through the center of rotation of the ball is perpendicular to the centerline axis of the fan.

According to a preferred embodiment of the present invention, the seat of the canopy comprises a lobed seat including at least one lobe defined by the inner and outer surfaces and extending radially outwardly from the inner surface to the outer surface. In this embodiment, the ball comprises a lobed ball including at least one lobe defined by the inner and outer surfaces of the lobed ball and extending radially outwardly from the inner surface to the outer surface of the ball. In one preferred embodiment, both the lobed seat and the lobed ball include three radially outwardly extending lobes, which are equally spaced circumferentially from one another. In an alternate embodiment, both the seat and ball include one radially outwardly extending lobe. In another alternate embodiment, both the seat and ball include two radially outwardly extending lobes. In each of the foregoing embodiments, the lobe or lobes of the seat and the lobe or lobes of the ball interact with another to permit the ceiling fan to pivot about the lobed ball and to prevent the ceiling fan from rotating about the longitudinal centerline axis of the ceiling fan. This permits the ceiling fan to accommodate a slope or unevenness in the ceiling to which the fan is mounted, while reacting the rotational torque of the ceiling fan motor such that the centerline of the fan remains substantially vertically disposed, and achieving a significantly reduced wobble pattern of the ceiling fan as compared to ceiling fans utilizing conventional suspension systems.

In the embodiment where both the ball and seat include three radially outwardly extending lobes, the lobed ball has an annular, tri-lobed, transverse cross-sectional shape defined by the inner and outer surfaces of the lobed ball. This tri-lobed, transverse cross-sectional shape has a first, relatively larger size at the upper end of the ball and a second, relatively smaller size at the lower end of the ball. The lobed ball maintains the tri-lobed, transverse cross-sectional shape longitudinally throughout, from the upper to the lower end of the ball. The outer surface of the ball has a tri-lobed shape which exists in any plane which passes transversely through the lobed ball and perpendicular to the longitudinal centerline axis of the ball. The outer surface of the ball is blended smoothly between the upper and lower ends of the ball to maintain the tri-lobed shape in any transverse plane. However, the size of the tri-lobed shape of the outer surface of the ball varies from a maximum size proximate the upper end of the ball to a minimum size at the lower end. This is a result of the outer surface of the lobed ball having an arcuate shape in any plane which passes longitudinally through the lobed ball, from the upper to the lower ends, and parallel to the longitudinal centerline axis of the ball.

In a first plane extending transversely through the ball and perpendicularly to the longitudinal centerline axis of the ball, each lobe of the ball is defined by a first radially outermost point on the outer surface and positioned by a first radius extending in the first transverse plane from the centerline axis of the ball to the radially outermost point. The radially outermost points of the three lobes are spaced about 120 degrees from one another. Each lobe is further defined within the first plane by a second point located on the outer surface and positioned clockwise circumferentially from the first, radially outermost point and a third point located on the outer surface and positioned counterclockwise from the first, radially outermost point. The second and third points of each of the lobes are defined by second and third radii extending in the first, transverse plane from the centerline axis of the lobed ball to the second and third points, respectively. The second and third radii are less than the first radius, are substantially equal to one another, with each of the second and third points comprising a radially innermost point of the lobe within the transverse plane. Each lobe is further defined within the transverse plane by first and second arcuate and continuous lines extending between the first and second points, and between the first and third points, respectively, for each of the lobes. The second and third points of each of the lobes are spaced about 60 degrees from the first point of the corresponding one of the lobes. The outer surface of the lobed ball is blended smoothly and continuously so that the second point of a given one of the lobes comprises the third point of a clockwise-adjacent one of the lobes, while the third point of the given one of the lobes comprises the second point of a counterclockwise-adjacent one of the lobes. Additionally, each lobe is further defined within the transverse plane by an arcuate line on the inner surface of the ball which is described by a fourth radius extending from the centerline axis of the ball to the inner surface, and extending throughout an arc subtended by radial lines extending from the centerline axis of the ball to the second and third points of the corresponding lobe. Also, each lobe is further defined within the transverse plane by radial lines extending between the inner and outer surfaces of the ball and intersecting the second and third points of the corresponding one of the lobes. Furthermore, the previously discussed characteristics of the shape of the lobes of the ball exists in any plane passing transversely through the lobed ball and perpendicularly to the longitudinal centerline axis of the ball, although the particular values of the first, second, third and fourth radii will vary depending upon the longitudinal height or position of the transverse plane.

The system for suspending a ceiling fan according to the present invention has particular application with regard to ceiling fans which include a downrod having upper and lower ends, with the lower end being connected to a stationary portion of the ceiling fan, such as the motor housing surrounding the ceiling fan motor. In this application, according to a preferred embodiment of the present invention, the system further includes a hollow sleeve having open upper and lower ends, with the sleeve being disposed in surrounding relationship with and connected to the upper end of the downrod of the ceiling fan. The sleeve has a substantially cylindrical inner surface and a tapered outer surface. In this embodiment, the lobed ball is disposed in surrounding relationship with the sleeve. The inner surface of the lobed ball defines an aperture extending through the ball which is effective for receiving the sleeve, with the inner surface of the ball being configured to frictionally engage the tapered outer surface of the sleeve. Both the inner surface of the lobed ball and the outer surface of the hollow sleeve are tapered radially outwardly between the lower and upper ends of the ball and sleeve, respectively. The inner surface of the lobed ball has a radially outward taper, preferably ranging from about 1.0 degrees to about 15.0 degrees relative to the longitudinal centerline axis of the ball. Similarly, the outer surface of the hollow sleeve has a radially outward taper which preferably ranges from about 1.0 degrees to about 15.0 degrees relative to the longitudinal centerline axis of the sleeve. The taper of both the outer surface of the sleeve and the inner surface of the ball may be about 7.0 degrees.

In this embodiment, the system further includes a pin which is effective for connecting the hollow sleeve to the upper end of the ceiling fan downrod which includes a pair of diametrically opposed holes extending radially therethrough. The hollow sleeve includes a pair of diametrically opposed apertures extending through an annular wall defined between the inner and outer surface of the hollow sleeve. The sleeve is positioned so that the apertures in the sleeve are aligned with the holes in the upper end of the downrod and the pin is inserted through the apertures in the hollow sleeve and the aligned holes in the upper end of the downrod, thereby connecting the hollow sleeve to the downrod.

The lobed ball may include a pair of diametrically opposed slots formed in the annular wall of the ball and extending longitudinally from the upper end of the ball toward the lower end of the ball. Each of these slots are effective for receiving one end of the pin thereby permitting the ball to translate somewhat in a longitudinal direction relative to the downrod. The hollow sleeve includes a slit which extends through the wall of the sleeve longitudinally from the lower end of the sleeve to and through the upper end of the sleeve thereby subdividing the sleeve into first and second circumferentially extending portions and permitting the sleeve to conform to the shape of the upper end of the ceiling fan downrod. The sleeve may further include a plurality of relief notches extending through the sleeve wall, with the notches extending longitudinally from one of the sleeve ends toward the other of the sleeve ends, with the notches facilitating circumferential compression of the sleeve for the purpose of conforming to the shape of the downrod. The sleeve may also include a generally U-shaped relief notch extending through the sleeve wall and longitudinally from the upper end of the sleeve toward the lower end of the sleeve. The lobed ball may further include a third slot formed in the annular wall of the ball and extending from the upper end toward the lower end of the ball. The generally U-shaped relief notch of the sleeve is aligned with the third slot in the lobed ball, whereby the U-shape notch and third slot are effective for receiving a means for grounding the ceiling fan which is attached to the upper end of the ceiling fan downrod.

BRIEF DESCRIPTION OF THE DRAWINGS

These and other features, aspects, and advantages of the present invention will become better understood with regard to the following description, appended claims and accompanying drawings wherein:

FIG. 9 is a perspective view of a downrod and ball assembly, incorporating a lobed all according to the present invention;

FIG. 10 is an exploded assembly of the downrod and ball assembly illustrated in FIG. 9;

FIG. 12 is a perspective view of further illustrating the lobed ball included in the assembly shown in FIGS. 9 and 10;

FIG. 13 is a top plan view of the lobed ball shown in FIG. 12;

FIG. 14 is a longitudinal cross-sectional view taken along line 14—14 in FIG. 13;

FIG. 18 is a bottom plan view of the lobed ball shown in FIGS. 12–17, taken along line 18—18 in FIG. 16;

FIG. 19 is a transverse cross-sectional view taken along line 19—19 in FIG. 16;

FIG. 20 is a transverse cross-sectional view taken along line 20—20 in FIG. 16;

FIG. 31 is a perspective view a lobed ball according to another alternate embodiment of the present invention, with the ball connected to a ceiling fan downrod;

FIG. 32 is a top plan view of the lobed ball shown in FIG. 31;

FIG. 33 is a top plan view of a canopy according to another alternate embodiment of the present invention and corresponding to the lobed ball shown in FIGS. 31 and 32;

FIG. 39 is a plan view of a gauge disk comparing the wobble patterns of a ceiling fan suspended with a conventional system to the wobble patterns of a ceiling fan incorporating the system for suspending a ceiling fan according to the present invention.

DETAILED DESCRIPTION

Figure 1:
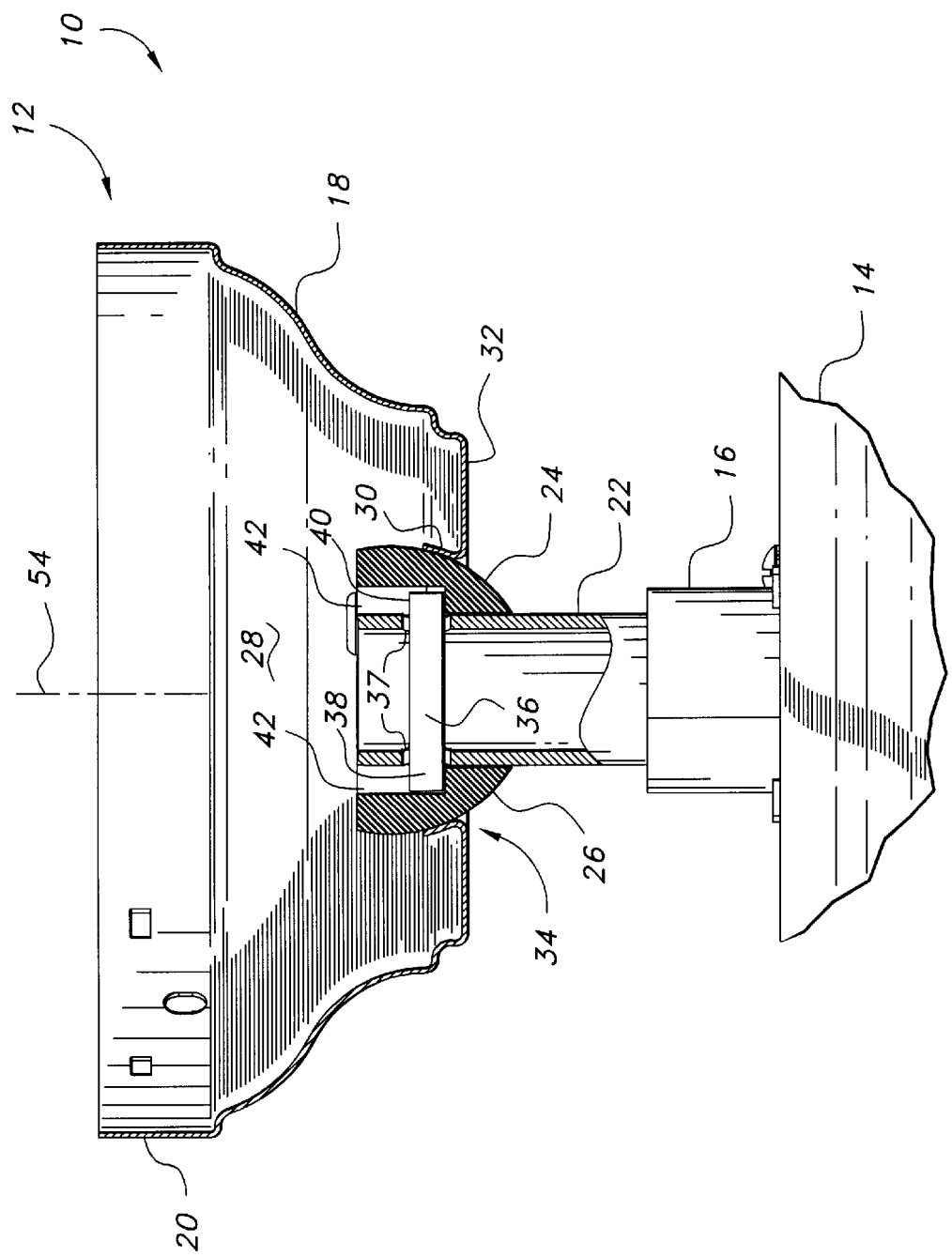
FIG. 1 is a fragmentary elevation view, partially in cross-section, illustrating a prior art ceiling fan suspension system.
Figure 2:
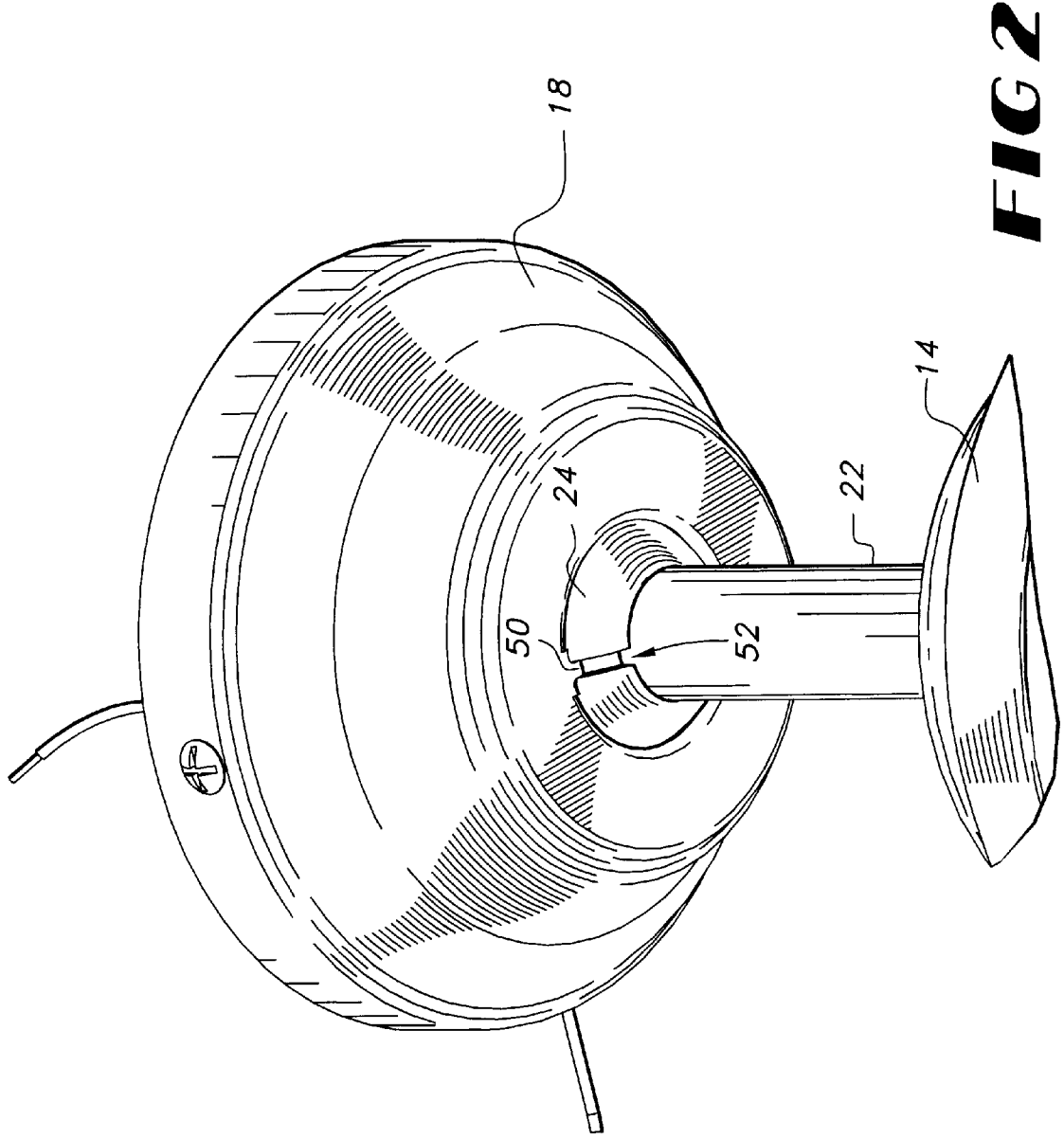
FIG. 2 is a perspective view further illustrating the prior art ceiling fan suspension system shown in FIG. 1.
Figure 3:
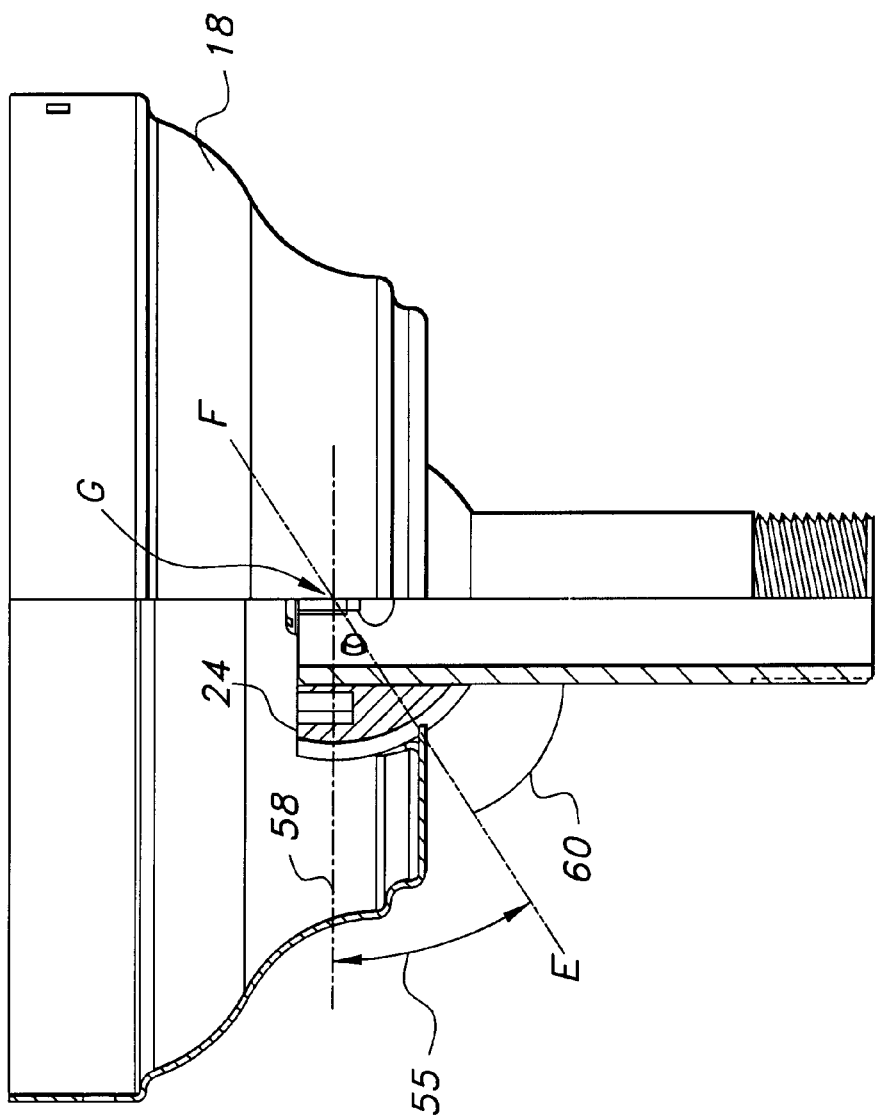
FIG. 3 is a fragmentary elevation view, partially in cross-section, similar to FIG. 1, further illustrating the prior art ceiling fan suspension system shown in FIG. 1.
Figure 4:
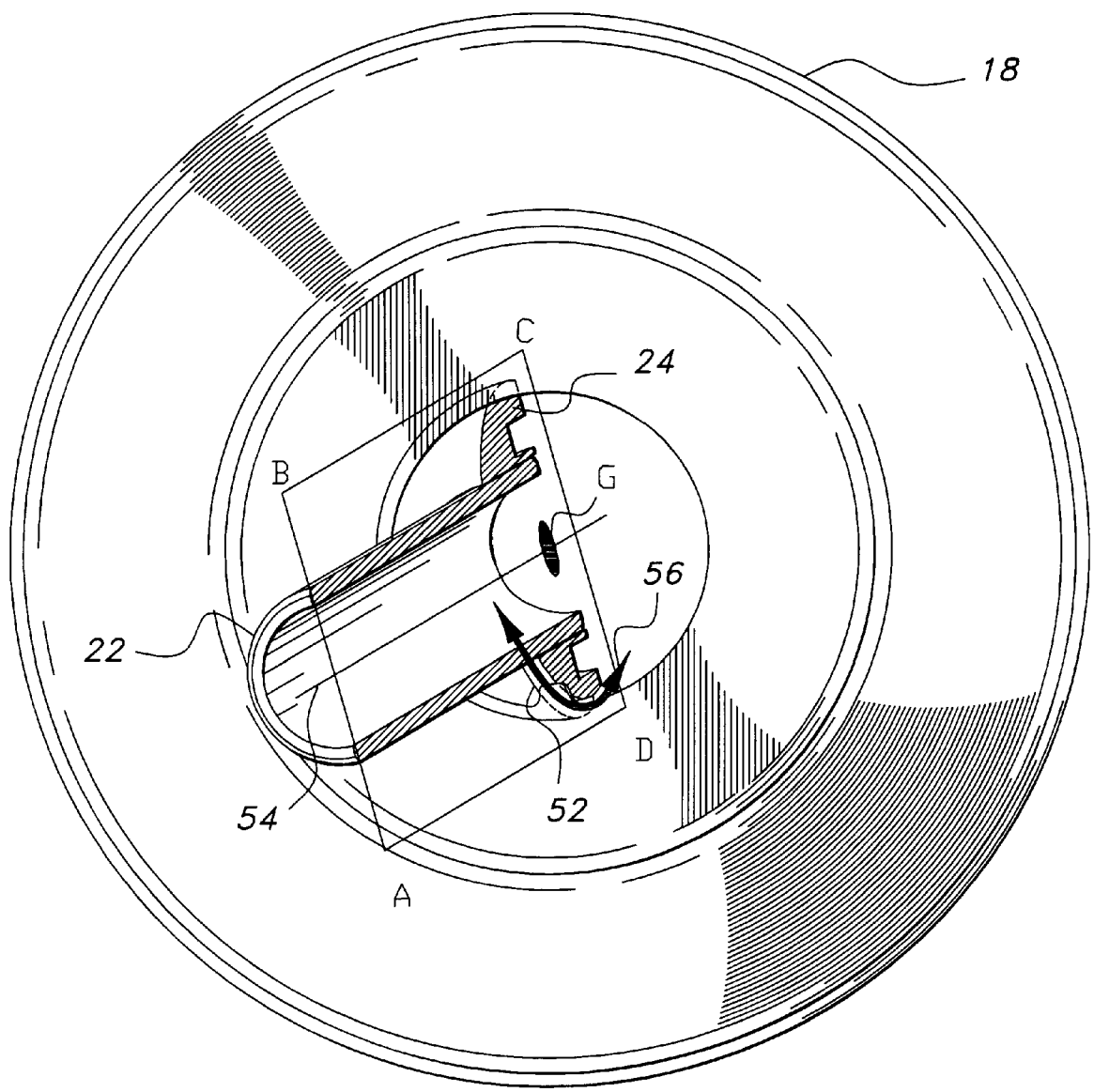
FIGS. 4–7 are a series of bottom plan views of the prior art suspension system shown in FIGS. 1–3, illustrating the possible motion of the included downrod and ball during operation of the ceiling fan.
Figure 5:
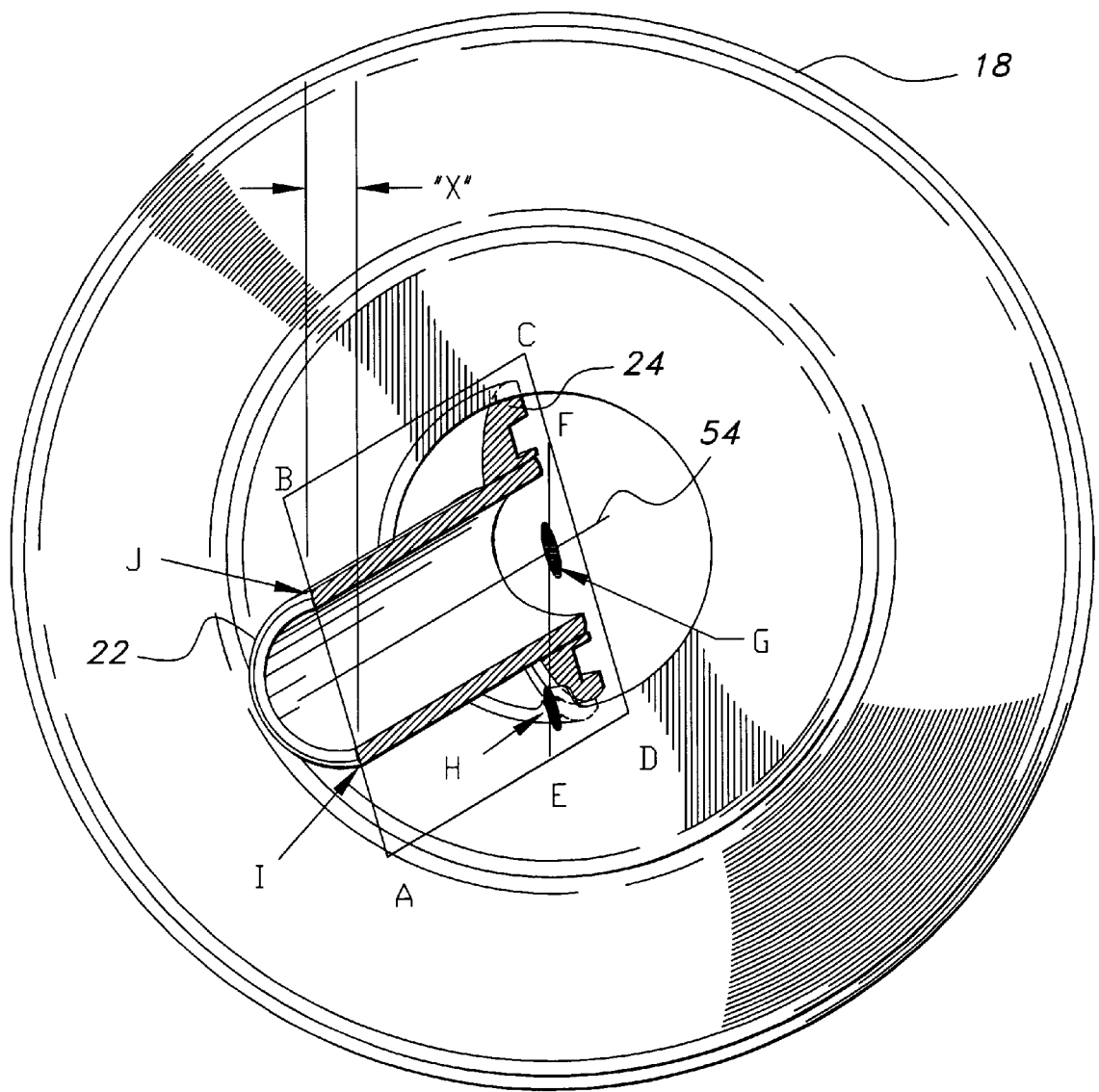
Figure 6:
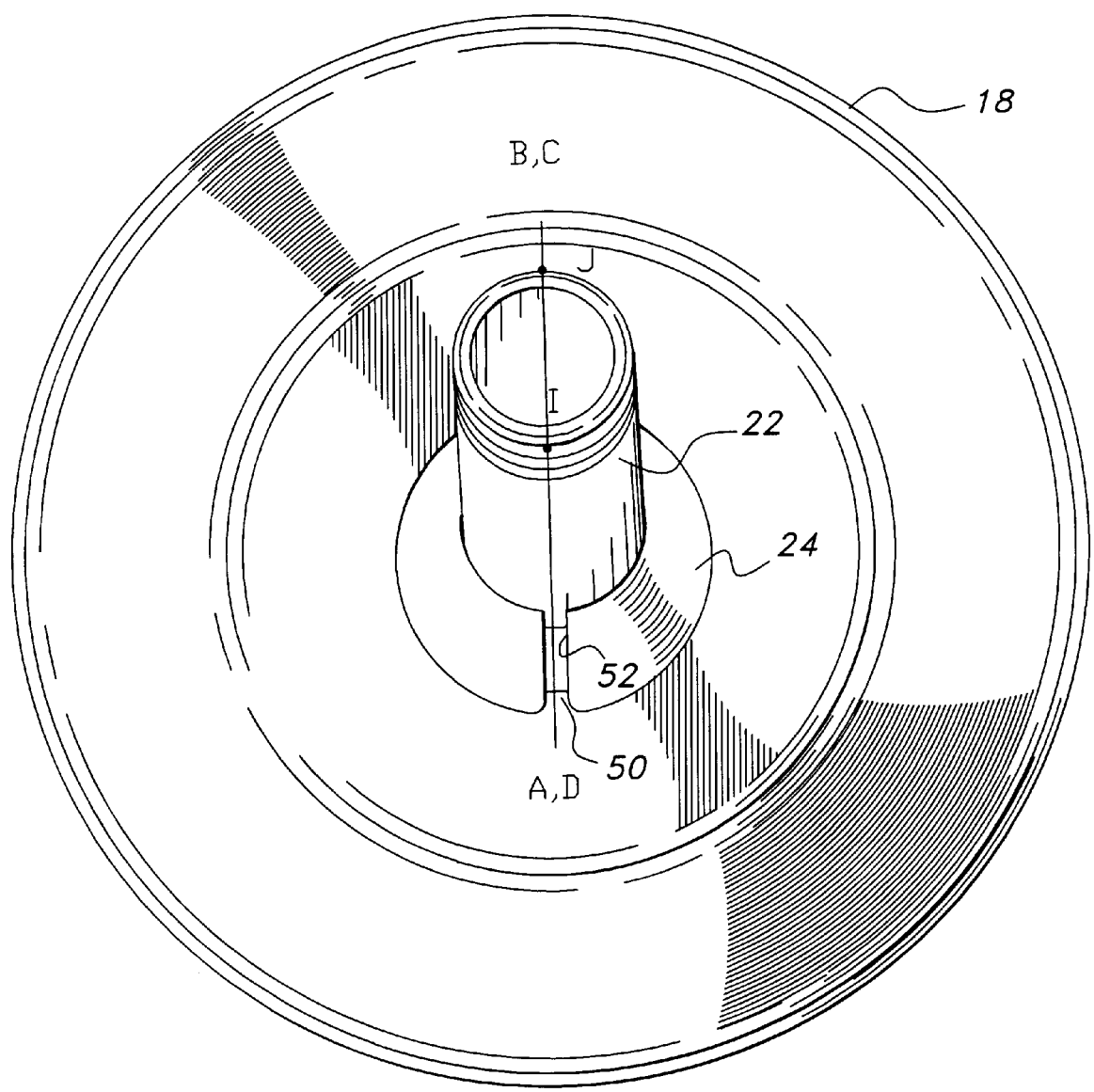
Figure 7:
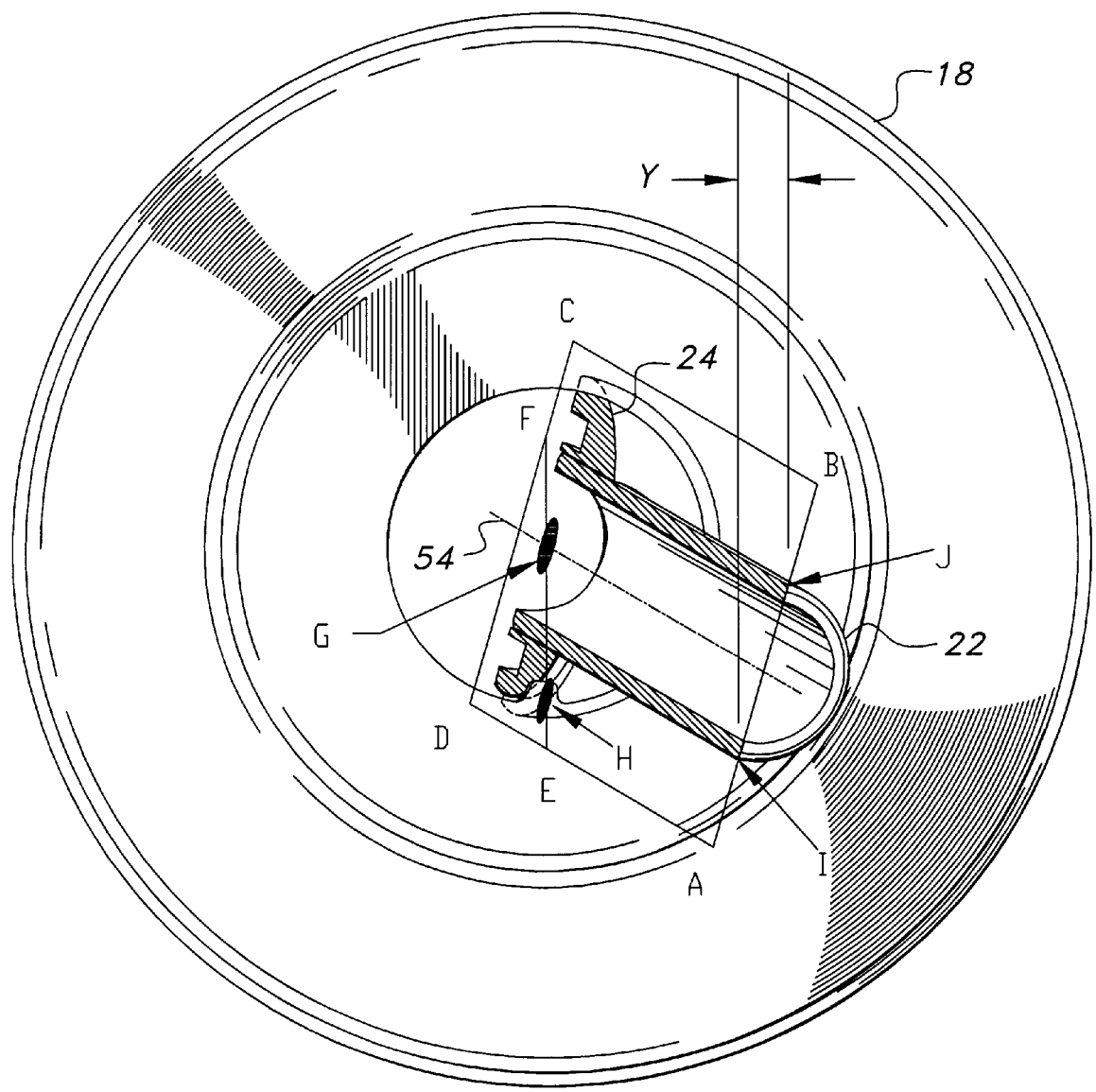
Figure 8:
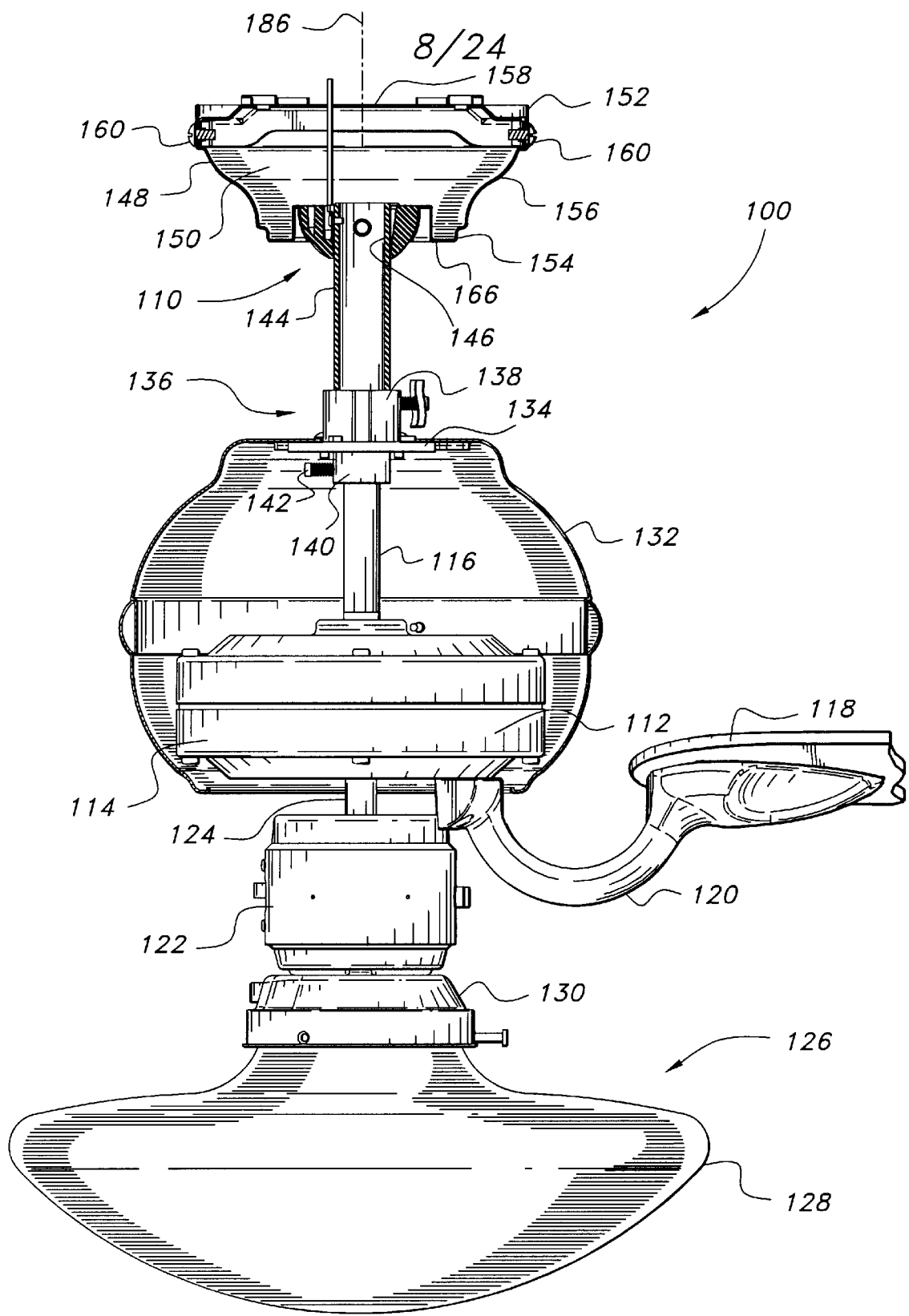
FIG. 8 is an elevation view, partly in cross-section and partially in cutaway view, of a ceiling fan which is suspended using the system of the present invention.

Referring now to the drawings, FIG. 8 is an elevation view, partially in cross-section and partially in cutaway view, illustrating a ceiling fan 100 which is suspended from a ceiling or other support structure (not shown) using a system, indicated generally at 110, according to the present invention. The ceiling fan 100 includes a motor 112 having a rotor 114 and a stator (partially obscured in FIG. 8) including a stator shaft 116. In the illustrative embodiment, the motor 112 comprises an inside-out motor wherein the rotor 114 is disposed in surrounding relationship with the stator. However, the particular configuration of the electric motor of the ceiling fan 100 does not form a part of the present invention, and the system 110 of the present invention may be utilized with ceiling fans having other types of motors, for instance those where the stator surrounds the rotor. Ceiling fan 100 further includes a plurality of fan blades 118 (one shown in fragmentary view) which are connected to the rotor 114 of motor 112 via blade irons 120 (one shown). Ceiling fan 100 further includes a switch housing 122 which is suspended below motor 112 via a lower end 124 of the stator shaft 116. In the illustrative embodiment, ceiling fan 100 includes a light fixture 126 having a globe 128 and a globe retaining socket 130 attached to a lower portion of the switch housing 122. The switch housing defines a hollow interior space in which the electrical circuitry required to operate the light fixture and the direction and speed of motor 112 is disposed.

Ceiling fan 100 also includes a motor housing 132 which is disposed in surrounding relationship with motor 112. The motor housing 132 may include a novel configuration or decorative outer surface. However, the particular configuration or design of motor housing 132 does not form a part of the present invention. The motor housing 132 is supported by a flange portion 134 of an adapter 136 having upper 138 and lower 140 receptacles. The lower receptacle 140 receives an upper end portion of the stator shaft 116 and is attached thereto. The upper end portion of the stator shaft 116 and receptacle 140 may be threaded to one another and the attachment may be further secured by a fastener 142. Ceiling fan 100 also includes a downrod 144 having a lower end which is disposed within and attached to the upper receptacle 138 of adapter 136. The downrod 144 has an upper end portion 146 (shown in FIGS. 8 and 10) which is connected to the system 110 for suspending a ceiling fan, as subsequently discussed in greater detail.

System 110 includes a hollow canopy 148 defining an interior space 150 and including an upper end portion 152, a lower end portion 154 and a central, body portion 156 extending between the upper 152 and lower 154 end portions. In the illustrative embodiment, the upper end portion 152 of canopy 148 comprises an annular flange which is operatively attachable to a support structure (not shown) such as a ceiling of a room or an electrical junction box disposed above the ceiling. In the illustrative embodiment, the upper end portion 152 of canopy 148 is attached to the support structure via a bracket 158 which is attached to the upper end portion 152 via fasteners 160 which pass through apertures 162 (best seen in FIG. 25) formed in the upper end portion 152. The bracket 158 is attached, preferably by fasteners, to the support structure. Bracket 158 may be configured as the bracket disclosed in commonly assigned U.S. Pat. No. 5,899,663, which is expressly incorporated by reference herein in its entirety. In this instance, the bracket 158 includes a pair of hooks protruding from one end of the bracket 158 which permits the canopy 148 to be pivotally suspended from the end of bracket 158 from which the hooks protrude. This facilitates supporting ceiling fan 100 while electrical connections are being made. However, it should be understood that any suitable bracketry or other attachment means may be used in lieu of bracket 158 to attach or connect the canopy 148 to the ceiling or other support structure. As shown in FIG. 8, the central body portion 156 of canopy 148 is generally bell shaped. However, it should be understood that the particular shape of the upper end portion 152 and central body portion 156 of canopy 148 may vary within the scope of the present invention.

Figure 26:
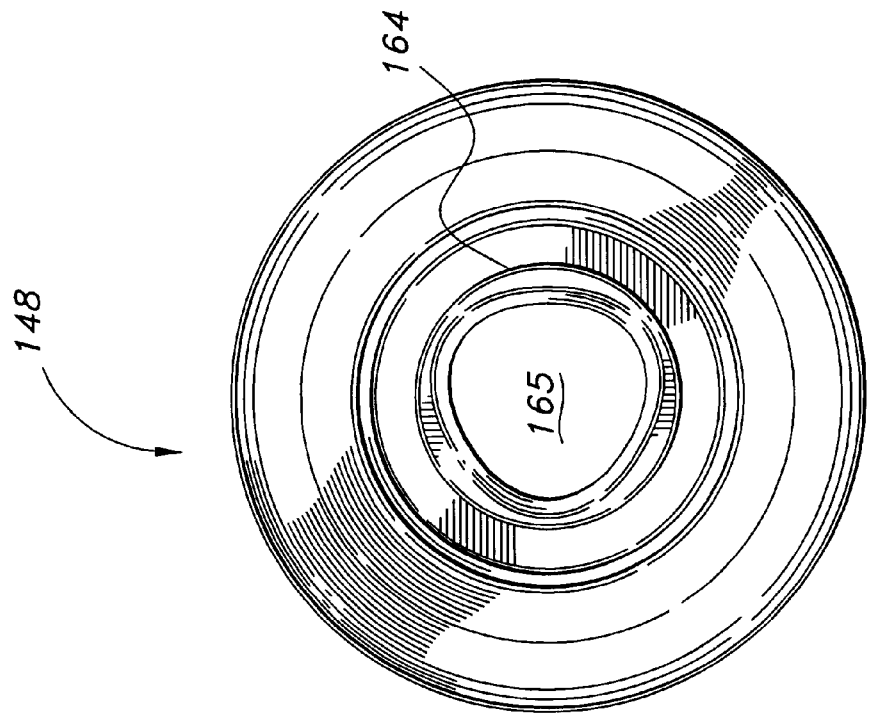
FIG. 26 is a top plan view of the canopy shown in FIG. 25.
Figure 25:
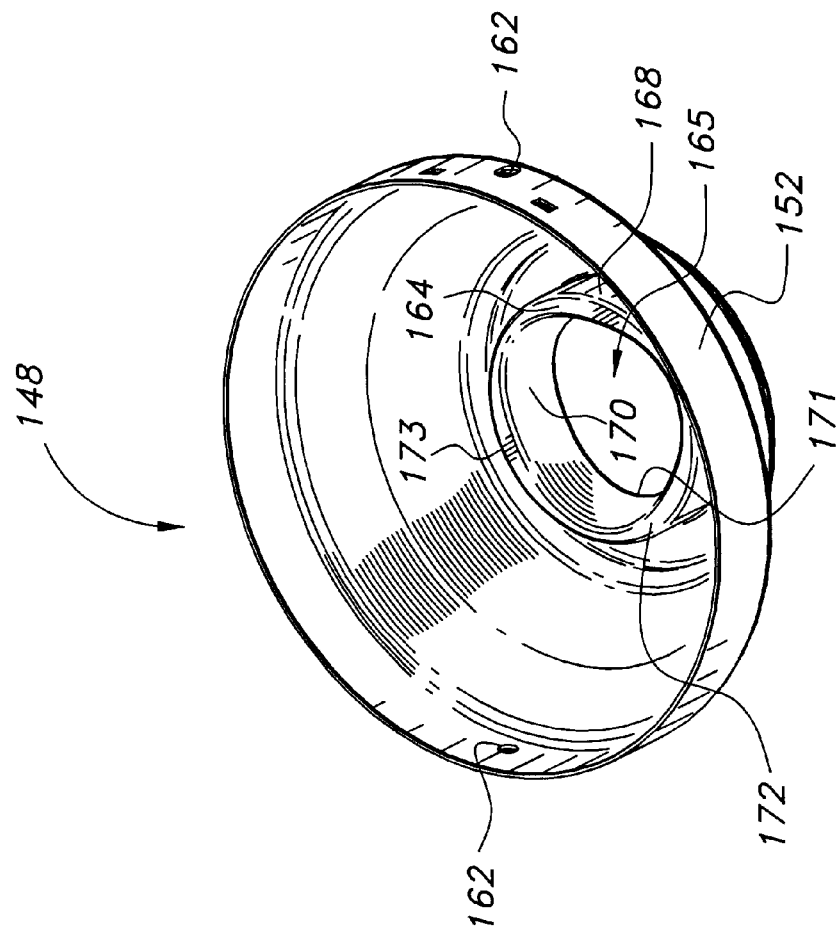
FIG. 25 is a perspective view of the canopy included in the system of the present invention.

As shown in FIGS. 8, 25 and 26, canopy 148 further includes a seat 164 which is connected to the lower end portion 154 and extends upwardly from a bottom surface 166 of the lower end portion 154. Seat 164 includes an outer surface 168 and an inner surface 170 defining an annular wall 172 therebetween. In the illustrative embodiment, the outer surface 168 of seat 164 has a substantially cylindrical shape. However, the shape of the outer surface 168 is relatively unimportant. In contrast, the shape of the inner surface 170 of seat 164 comprises a central feature of the present invention. In the embodiment shown in FIGS. 25 and 26, the inner surface 170 of seat 164 has a tri-lobed shape as subsequently discussed further in greater detail.

The upper end portion 152, lower end portion 154 and central body portion 156 of canopy 148 are preferably made from a metal or metallic alloy and may include a decorative outer surface finish. In one embodiment the seat 164 is integrally formed with portions 152, 154 and 156 of canopy 148 using conventional methods such as stamping or casting. In this embodiment seat 164 is made from the same metal or metallic alloy as the remainder of canopy 148. In other embodiments, seat 164 may be manufactured separately from the remainder of canopy 148 and then attached to the lower end portion 154 of canopy 148. For instance, seat 164 may be made from molded plastic such as ABS, with seat 164 then bonded or otherwise attached to the lower end portion 154 of canopy 148. Also, seat 164 may be made from other materials including nylon.

Prior to attaching the upper end portion 152 of canopy 148 to the ceiling or other support structure, the system 110 is connected to the stationary portion of ceiling fan 100 as subsequently described. System 110 further includes a lobed ball 174, having an upper end 176, a lower end 178, an outer surface 180 and an inner surface 182 which define an annular wall 184 extending between the upper 176 and lower 178 ends of the lobed ball 174. In one preferred embodiment, ball 174 is made from a nylon material manufactured by Autochem, located in Serguigny, France. The nylon material has a manufacturer's designation of BMNY 1.47. Seat 164 of canopy 148 may also be made of this nylon material in the embodiments where seat 164 is manufactured separately from the remainder of the canopy as discussed previously. In other embodiments, ball 174 may be made from plastic materials, such as ABS, or may be made from various metals or metallic alloys such as steel. The outer surface 180 of ball 174 preferably has a textured surface but may also have a smooth surface. The textured surface is preferred since this may facilitate the pivoting action of ball 174 during operation of fan 100. In the illustrative embodiments the outer surface 180 of ball 174 is shown as being smooth.

The inner surface 182 of ball 174 has a frustoconical shape and tapers radially outwardly from the lower end 178 to the upper end 176 of ball 174, for subsequently described purposes. The outer surface 180 of the lobed ball 174 has a shape which is complementary to the shape of the inner surface 170 of seat 164 of canopy 148. The complementary shapes of the outer surface 180 of ball 174 and the inner surface 170 of seat 164 comprise a central feature of the present invention. Surfaces 180 and 170 interact with one another to allow the ceiling fan 100 to pivot about the lobed ball 174, while preventing the ceiling fan 100 from rotating about a longitudinal centerline axis 186 of fan 100. Furthermore, the complementary shapes of surfaces 170 and 180 permit the rotational torque of motor 112 of ceiling fan 100 to be reacted in such a manner that the longitudinal centerline axis 186 of fan 100 remains substantially vertically disposed, unlike ceiling fans which are suspended by conventional systems such as that described in conjunction with FIGS. 1–7. The particular shape of the lobed ball 174 will be discussed in greater detail subsequently in conjunction with FIGS. 12–20.

Referring now to FIGS. 9–11 and 21–24, system 110 further includes a hollow sleeve 190 having open upper 192 and lower 194 ends. In one preferred embodiment sleeve 190 may be made from the same nylon material as that described previously with respect to ball 174. However, sleeve 190 may also be constructed from other materials including various plastics such as ABS and various metals or metallic alloys such as steel. The hollow sleeve 190 includes inner 196 and outer 198 surfaces forming a wall 200 extending therebetween. The hollow sleeve 190 is disposed in surrounding relationship with the upper end portion 146 of the downrod 144, and is connected to the upper end portion 146 via a pin 202 shown in FIGS. 9–11. Sleeve 190 includes a pair of diametrically opposed apertures 204, comprising substantially circular holes in the illustrative embodiment, which extend radially through the wall 200 of sleeve 190. The upper end portion 146 of the downrod 144 also includes a pair of diametrically opposed apertures 206, comprising substantially circular holes in the illustrative embodiment, extending radially therethrough. Sleeve 190 is positioned in surrounding relationship with the upper end portion 146 of the downrod 144 so that apertures 204 of sleeve 190 are aligned with apertures 206 in the upper end portion 146 of downrod 144. Pin 202 is then inserted through the apertures 204 and the aligned apertures 206, thereby connecting the hollow sleeve 190 to the upper end portion 146 of the downrod 144.

The inner surface 196 of sleeve 190 is substantially cylindrically shaped to conform to the shape of the upper end portion 146 of the downrod 144. The fit of sleeve 190 to the upper end portion 146 of downrod 144 is further facilitated by the following features of hollow sleeve 190. Sleeve 190 includes a slit 208 which extends through the wall 200 and extends longitudinally from the lower end 194 to the upper end 192 of sleeve 190. This permits the sleeve 190 to contract and expand in a hoop or circumferential direction so as to conform to the upper end portion 146 of the downrod 144.

Sleeve 190 also includes a plurality of relief notches 214 which extend through the wall 200 and throughout a longitudinal portion of the sleeve 190. In the illustrative embodiment, the notches 214 extend upward from the lower end 194 toward the upper end 192 of sleeve 190. Alternatively, notches 214 may extend from the upper end 192 toward the lower end 194 of sleeve 190. The relief notches 214 further facilitate expansion or compression of sleeve 190 in a hoop or circumferential direction, thereby further facilitating the fit of sleeve 190 to the upper end portion 146 of downrod 144.

Figure 11:
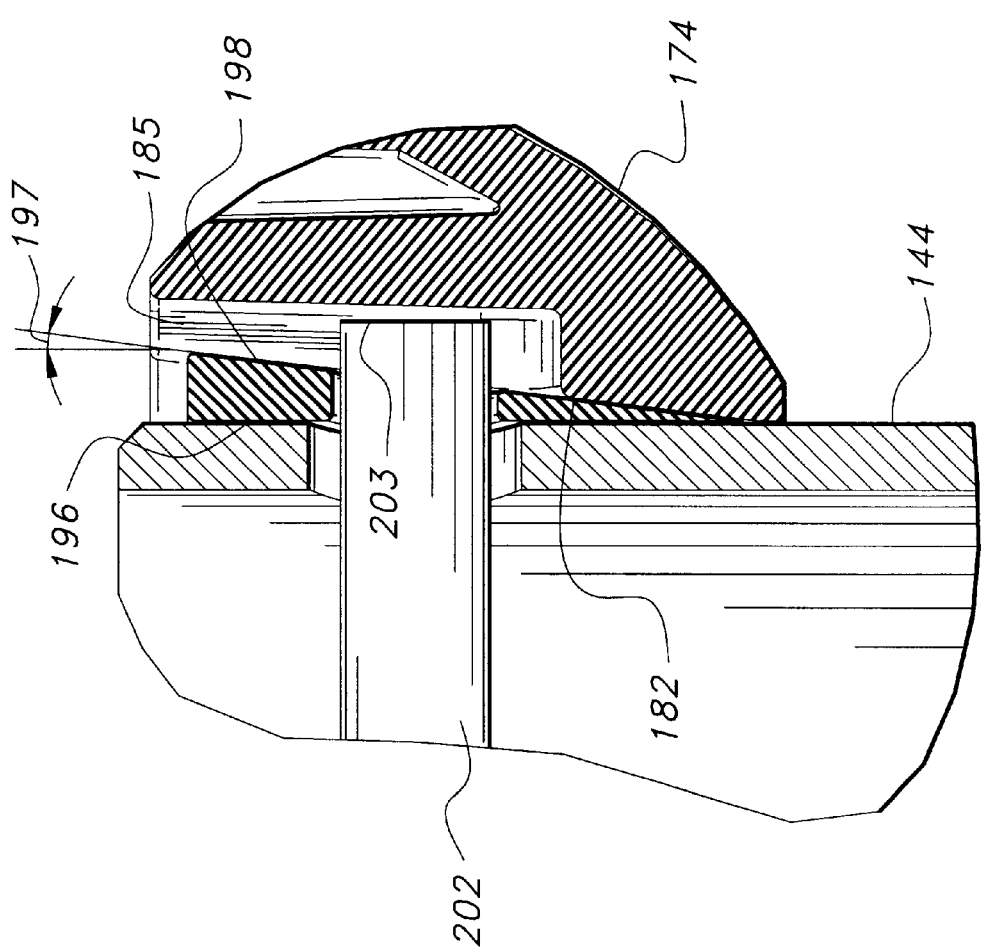
FIG. 11 is a fragmentary cross-sectional view further illustrating the downrod and ball assembly shown in FIGS. 9 and 10.

The lobed ball 174 is disposed in surrounding relationship with the hollow sleeve 190, as best seen in FIGS. 9 and 11, with the inner surface 182 of the lobed ball 174 and the outer surface 198 of sleeve 190 being configured so that the lobed ball 174 frictionally engages sleeve 190. More particularly, both the outer surface 198 of sleeve 190 and the inner surface 182 of the lobed ball 174 are tapered radially outwardly between the lower 194 and upper 192 ends of sleeve 190 and the lower 178 and upper 176 ends of the lobed ball 174, respectively. More particularly, the inner surface 182 of lobed ball 174 has a radially outward taper 183, preferably ranging from about 1.0 degrees to about 15.0 degrees relative to a longitudinal centerline axis 175 of the lobed ball 174. Most preferably, the taper 183 of the inner surface 182 of the lobed ball 174 is about 7.0 degrees. Similarly, the outer surface 198 of sleeve 190 includes a radially outward taper 197 (shown in FIGS. 11 and 23), which preferably ranges from about 1.0 degrees to about 15.0 degrees relative to a longitudinal centerline axis 191 of sleeve 190. Most preferably, the taper 197 of the outer surface 198 of sleeve 190 is about 7.0 degrees. The matching tapers 183 of ball 174 and 197 of sleeve 190, allow the ball 174 and sleeve 190 to frictionally engage one another. The tightness of the fit between ball 174 and sleeve 190 varies with the relative longitudinal position of ball 174 and sleeve 190.

Pin 202, which connects sleeve 190 to the upper end portion 146 of downrod 144, includes a pair of opposing ends 203. As shown in FIG. 11 with regard to one of the ends 203, each of the ends 203 of pin 202 is disposed within a longitudinally extending slot 185 formed in the annular wall 184 of ball 174 and opening onto the inner surface 182 of ball 174. Slots 185 extend longitudinally from the upper end 176 toward the lower end of 178 of the lobed ball 174 and permits the ball 174 to move longitudinally upward or downward relative to pin 202 and sleeve 190. In the installed position, when ball 174 engages the seat 164 of canopy 148, the gravitational loads of ceiling fan 100 force the downrod 144 and sleeve 190 to move downward somewhat relative to the ball 174. As this occurs, the fit between ball 174 and sleeve 190 becomes increasingly tighter due to the interaction of the tapers 183 and 197 of ball 174 and sleeve 190, respectively. As seen in FIG. 11, the wall 200 of sleeve 190 has a wedge shaped cross-section which increases in size from the lower 194 to the upper 192 ends of sleeve 190.

The use of sleeve 190 to connect ball 174 to the upper end portion 146 of the downrod 144, in lieu of a set screw such as that described previously with respect to the conventional system for suspending a ceiling fan illustrated in FIGS. 1–7, results in a tight fit among the ball 174, sleeve 190 and the upper end portion 146 and a concentric positioning of the upper end portion 146 and sleeve 190 within ball 174. This results in reduced ceiling fan wobble relative to the use of the set screw of the aforementioned conventional suspension system. Accordingly, it may be appreciated that the hollow sleeve 190 may be advantageously used with other suspension systems such as the conventional system illustrated in FIGS. 1–7. In this instance, the inner surface of the conventional ball 24 would be modified to have a taper matching the taper 197 of the outer surface 198 of the hollow sleeve 190.

The lobed ball 174 further includes a slot 187 formed in the annular wall 184 and extending longitudinally from the upper end 176 toward the lower end 178 of ball 174. Slot 187 opens onto the inner surface 182 of ball 174. When ball 174 is disposed in surrounding relationship with sleeve 190, slot 187 is aligned with a generally U-shaped relief notch 216 formed in the wall 200 of sleeve 190 and extending from the upper end 192 toward the lower end 194 of sleeve 190. The slot 187 of ball 174 and the U-shaped notch 216 of sleeve 190 are effective for receiving a means for grounding the ceiling fan which comprises a ground wire 218 having a connector 220 attached at one end thereof. The connector 220 is attached to the upper end portion 146 of the downrod 144 via a conventional fastener 222, such as a screw of bolt, which passes through an opening in the connector 220 and is threaded into an opening 224 formed in the upper end portion 146 of downrod 144, as shown in FIGS. 9 and 10. The connector 220 resides in the cavity formed by notch 187 of ball 174 and slot 216 of sleeve 190, with the wire 218 being routed outward through this cavity.

After the ball 174 has been disposed in surrounding relationship with sleeve 190, a fastener 226, comprising a screw or bolt, is threaded into the upper end 176 of the lobed ball 174. The fastener 226 includes a head 228 which resides in a recess 230 formed in the upper end 176 of ball 174. The head 228 of fastener 226 is sized so that it overlaps, in a radial direction, the upper end 192 of the hollow sleeve 190. This prevents the hollow sleeve 190 from passing outward through the opening formed in the upper end 176 of the lobed ball 174. The lobed ball 174 may optionally include a plurality of recesses such as recesses 232 and 233, which may comprise various shapes, formed in the annular wall 184 of ball 174, at the upper end 176 of ball 174, for weight and cost reduction purposes.

Figure 27:
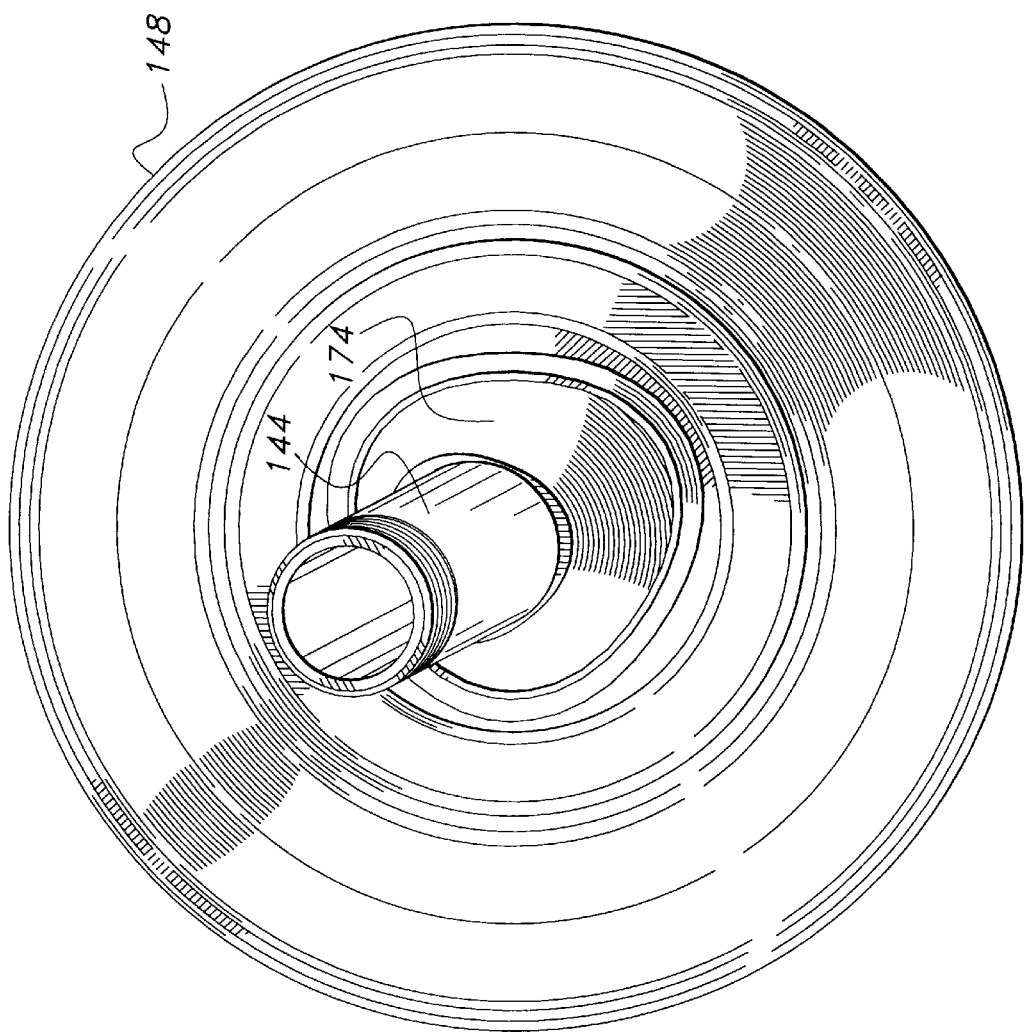
FIG. 27 is a bottom plan view illustrating the lobed ball shown in FIGS. 8–20 installed in the canopy shown in FIGS. 25 and 26.

Once the sleeve 190 and ball 174 are assembled to the downrod 144, as shown in FIG. 9, the subassembly is inserted in the canopy 148 so that a lower threaded end 147 of the downrod 144 passes through an aperture 165 (best seen in FIGS. 25 and 26) formed by the seat 164 of canopy 148, and extends below the canopy 148. The lower threaded end 147 of the downrod 144 is then threaded into the upper receptacle 138 of adapter 136, thereby joining the downrod 144 with the remaining portion of the ceiling fan 100. Ceiling fan 100 is then raised so that the canopy 148 is pivotally suspended from bracket 158, as discussed previously. The electrical wires necessary to operate ceiling fan 100 are routed upward through the hollow interior of the downrod 144 and are connected to the electrical junction box (not shown). The canopy is then secured to the bracket 158, completing the mounting of the ceiling fan 100 to the ceiling. In this installed position, the lobed ball 174 is pivotally disposed within the seat 164 of the canopy 148. FIG. 27 is a bottom plan view illustrating the lobed ball 174 disposed within canopy 148, with the downrod 144 protruding below the canopy 148.

Figure 16:
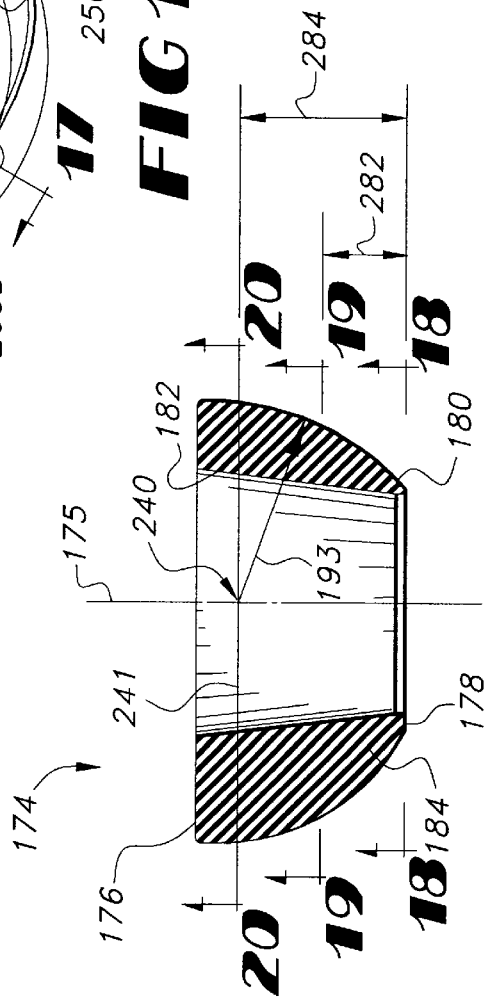
FIG. 16 is a longitudinal cross-sectional view taken along line 16—16 in FIG. 15.
Figure 23:
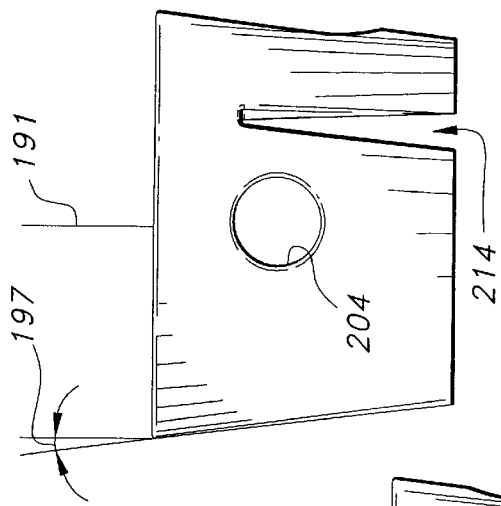
FIGS. 22–24 are elevation views farther illustrating the sleeve shown in FIG. 21.
Figure 24:
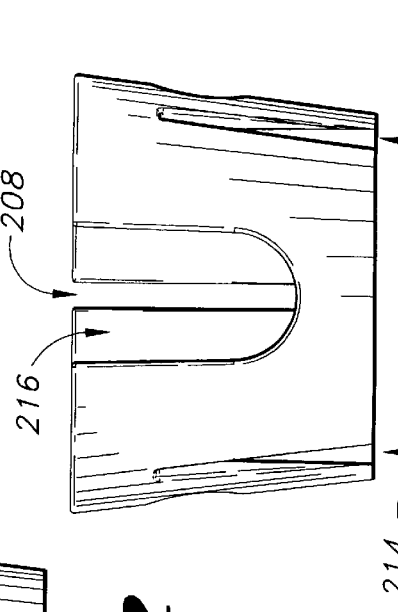
Figure 22:
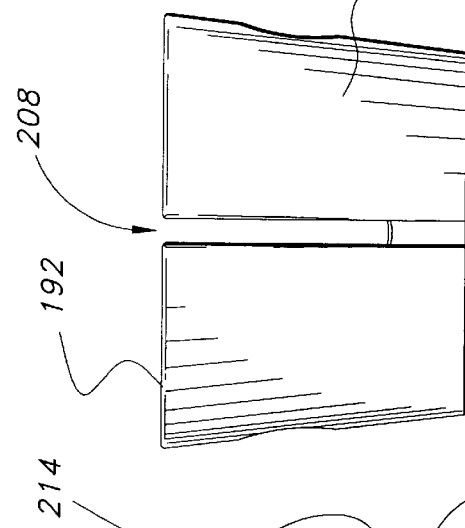
Figure 21:
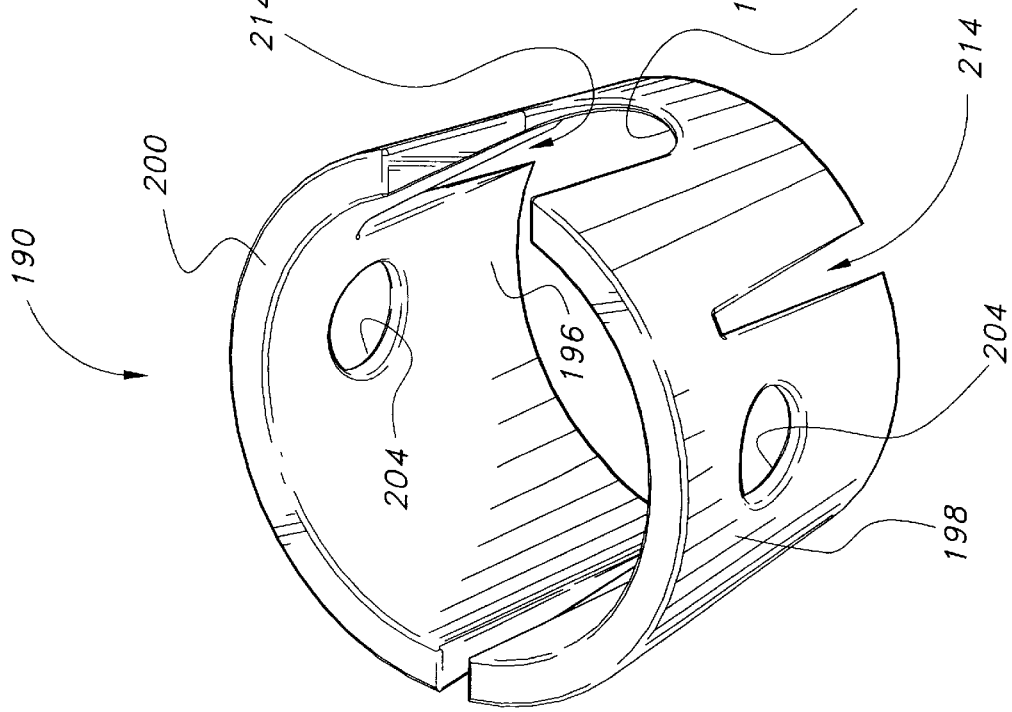
FIG. 21 is a perspective view of a sleeve according to the present invention, which is incorporated in the downrod and ball assembly shown in FIGS. 9–11.

As discussed previously, the shape of the outer surface 180 of the lobed ball 174 and the complementary shape of the inner surface 170 of the seat 164 of canopy 148, comprise a central feature of the present invention. Surfaces 180 and 170 interact with one another to permit the lobed ball 174, and accordingly the ceiling fan 100, to pivot about an axis 241 which passes through a center of rotation 240 which lies along the centerline axis 175 of ball 174 (which coincides with the longitudinal centerline axis 186 of the ceiling fan 100 when ball 174 is disposed within seat 164) at a position spaced below but proximate the upper end 176 of the lobed ball 174, as shown in FIG. 16. The center of rotation 240 corresponds to the point where a radius 193 originates which defines a portion of the outer surface 182 (that shown on the right hand side of FIG. 16) of ball 174. The axis 241 is substantially perpendicular to the centerline axis 175 of ball 174 and is also substantially perpendicular to the centerline axis 186 of ceiling fan 100, regardless of the position of ball 174 relative to the seat 164 of canopy 148. This allows the lobed ball 174 to pivot within seat 164 of canopy 148, so that ceiling fan 100 may be mounted to a vaulted ceiling, while the longitudinal centerline axis 186 of ceiling fan 100 remains substantially vertically disposed. Furthermore, since the axis 241 is perpendicular to axis 186 of fan 100 and moves with ball 174, surfaces 170 and 180 interact with one another to react the torque produced by the motor of 112 of ceiling fan 100, while permitting the longitudinal centerline axis 186 to remain substantially vertically disposed, thereby eliminating the problem of conventional systems which causes the centerline axis of the fan to be canted relative to vertical due to reacting the ceiling fan motor torque. Additionally, the complementary shapes of surface 180 of ball 174 and surface 170 of seat 164 prevent the ceiling fan 100 from rotating about the centerline axis 186 of fan 100, thereby preventing the electrical wires (not shown) routed upward through the hollow interior of downrod 144, from becoming entangled during operation of fan 100.

Figure 17:
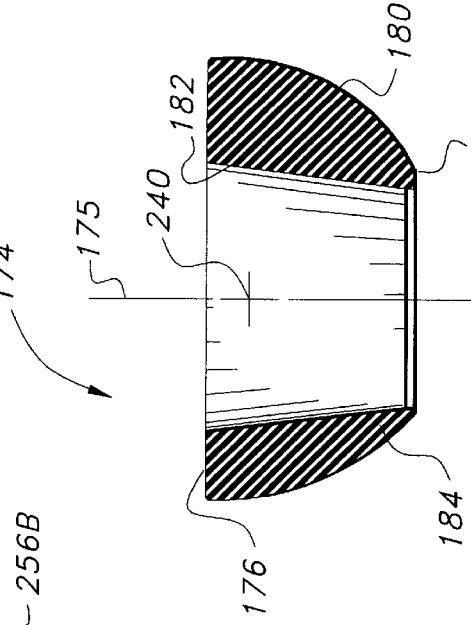
FIG. 17 is a longitudinal cross-sectional view taken along line 17—17 in FIG. 15.

The shape of the lobed ball 174 may be further appreciated with reference with to FIGS. 12–20. The lobed ball 174 includes three lobes 250 which are defined by the inner 182 and outer 180 surfaces of the lobed ball 174, and extend radially outwardly from the inner surface 182 to the outer surface 180 of the lobed ball 174. The radially outwardly extending lobes 250 of the lobed ball 174 extend longitudinally from the upper end 176 to the lower end 178 of the lobed ball 174. Lobes 250 are equally spaced circumferentially from one another. As shown in FIGS. 13, 15 and 18–20, the lobed ball has an annular, tri-lobed, transverse cross-sectional shape defined by the inner 182 and outer 180 surfaces of the lobed ball 174. The annular, tri-lobed, transverse cross-sectional shape of ball 174 extends longitudinally from the upper 176 to the lower 178 end of the ball 174, although the size of the tri-lobed shaped varies with longitudinal position along the ball 174. As may be seen by comparing the top plan view of FIG. 15 to the bottom plan of view FIG. 18, the tri-lobed, transverse cross-sectional shape of ball 174 has a first, relatively larger size at the upper end 176 of ball 174, and a second, relatively smaller size at the lower end 178 of ball 174. In any plane passing transversely through the lobed ball 174 and perpendicular to the longitudinally centerline axis 175 of ball 174, such as the transverse planes illustrated in FIGS. 19 and 20, the outer surface 180 of the lobed ball 174 has a tri-lobed shape. This is also true at the upper end 176 and lower ends 178 of ball 174. In any plane which passes longitudinally through the lobed ball 174 from the upper 176 to the lower 178 end of the lobed ball, and also passes through the centerline axis 175 of ball 174 or is parallel to the axis 175, such as the planes which are illustrated in FIGS. 16 and 17, the outer surface 180 of ball 174 has an arcuate shape.

Figure 15:
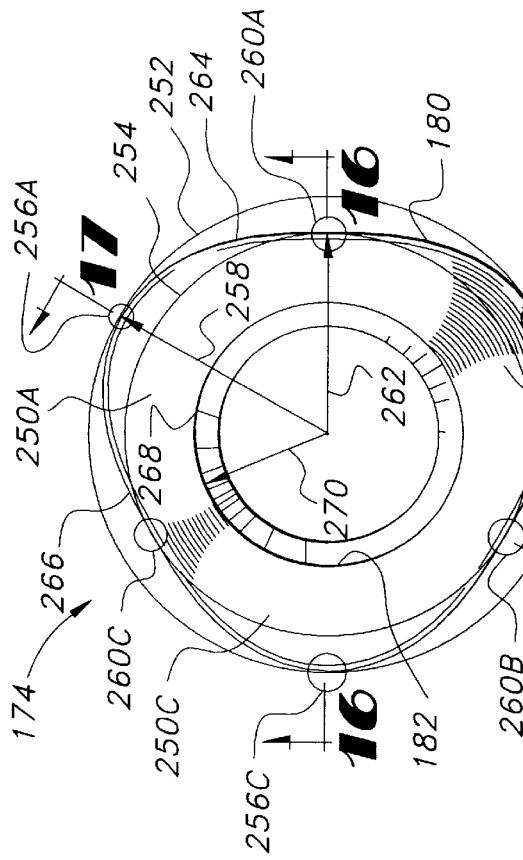
FIG. 15 is another top plan view of the lobed ball shown in FIGS. 12–14, with various apertures eliminated for clarity of illustration, and construction circles added for purposes of illustration.

The shape of the lobes 250 of ball 174, as well as the shape of the outer surface 180 of ball 174 may be better appreciated with reference to FIGS. 15 and 18–20. In the illustrative embodiment the upper end 176 of ball 174 is substantially flat and therefore lies in a transverse plane which is perpendicular to the centerline axis 175. Accordingly, the transverse cross-sectional shape of ball 174 may be illustrated in the top plan view of FIG. 15. However, it should be understood that in other embodiments, the upper end 176 of ball 174 may not be substantially flat. The three lobes 250 are designated as 250A, 250B and 250C in FIG. 15 with lobe 250B being disposed adjacent to and clockwise from lobe 250A and lobe 250C being disposed adjacent to and counterclockwise from lobe 250A. First 252 and second 254 construction circles, each shown in broken lines, have been added to FIG. 15 for purposes of illustration. As shown in FIG. 15, the outer circle 252 intersects the outer surface 180 of the lobed ball 174 at three locations identified as 256A, 256B and 256C. Each of these points is defined by a radius 258 which extends from the longitudinal centerline axis 175 to the outer surface 180, within the transverse plane passing through the upper end 176 of ball 174. It is also noted that the second or inner circle 254 intersects the outer surface 180 of the lobed ball 174 at three locations indicated at 260A, 260B and 260C. Each of these points is defined by a radius 262 which extends from the longitudinal centerline axis 175 to the outer surface 180, within the transverse plane passing through the upper end 176, such that the radius 262 is perpendicular to axis 175.

Lobe 250A is defined within the transverse plane shown in FIG. 15, by point 256A which comprises a radially outermost point of lobe 250 within the plane shown. Lobe 250A is further defined by points 260B and 260C, each comprising a radially innermost point of lobe 250A within the plane shown. Lobe 250A is further defined by a first arcuate line 264 extending between points 256A and 260A, within the plane shown, and a second arcuate line 266 extending between points 256A and 260C, within the plane shown. Lines 264 and 266 lie on the outer surface 180. Lobe 250A is further defined by an arcuate line 268 on the inner surface 182 described by a radius 270 extending from centerline axis 175 of ball 174 to the inner surface 182 of ball 174, with the arcuate line 268 extending throughout an arc subtended by radial lines, corresponding to radius 262, extending from the centerline axis 175 to points 260A and 260C. Lobe 250A is further defined by radial lines extending in the transverse plane shown between the inner 182 and outer 180 surfaces and intersecting points 260A and 260C.

The shape of lobes 250B and 250C is similarly defined by the radii 258, 262 and 270. Also, it is noted that point 260A comprises a radially innermost point of lobe 250A and the clockwise adjacent lobe 250B, while point 260C comprises a radially innermost point of lobe 250A and the counterclockwise adjacent lobe 260C, within the transverse plane shown. Point 260B comprises a radially innermost point of lobes 250B and 250C. The shape of lobes 250A, 250B and 250C is maintained throughout the longitudinal extent of ball 174, in any plane passing transversely through the ball 174 and perpendicular to axis 175, although the size of the lobes 250 varies with the longitudinal position of the particular transverse plane. For instance, as shown in FIG. 19, each of the lobes 250 includes a radially outermost point 272 on the outer surface 180, within the transverse plane shown, and positioned by a radius 274 extending in the transverse plane shown in FIG. 19 from the centerline axis 175 of the ball 174 to the corresponding one of the points 272, which are indicated as 272A, 272B and 272C for lobes 250A, 250B and 250C, respectively. Also, each of the lobes 250 includes a pair of radially innermost points 276, defined by a radius 278 extending from the centerline 175 to the outer surface 180, within the transverse plane shown. For instance, lobe 250A includes a first radially innermost point 276A and a second radially innermost point 276C, while lobe 250B includes radially innermost points 276A and 276B, etc. Further, each lobe includes arcuate lines connecting the corresponding one of the radially outermost points 272 with each of the radially innermost points 276. Further, each of the lobes 250 includes an arcuate line described by a radius 280 extending from the centerline axis 175 to the inner surface 182 of the lobed ball 174, with the arcuate line extending throughout an arc subtended by radial lines extending from the centerline axis 175 to the corresponding ones of the radially innermost points 276. Each of the lobes 250 is further defined in the transverse plane shown in FIG. 19 by a pair of radial lines, each extending between the inner 182 and outer 180 surfaces and intersecting one of the radially innermost points 276 on the outer surface 182 of the corresponding lobe 250. The radii 274 and 278 are smaller than the corresponding radii 258 and 262 at the upper end 176 of ball 174 due to the arcuate shape of the outer surface 180 between the upper 176 and lower 178 ends of ball 174. Also, the radius 280 is smaller than the corresponding radius 270 at the upper end 176 of ball 174 due to the radially outward taper of the inner surface 182 and since the transverse plane illustrated in FIG. 19 is below the upper end 176 of ball 174. The outer surface 180 of ball 174 is blended smoothly and continuously throughout to maintain the transverse, cross-sectional shape of ball 174 throughout the longitudinal extent of ball 174 from the upper end 176 to the lower end 178 of ball 174.

As discussed previously, the shape of the inner surface 170 of the seat 164 of canopy 148 complements the shape of the outer surface 180 of the lobed ball 174. This may be further appreciated with reference to FIGS. 8, 16, 19, 20, 25 and 26. As shown in FIG. 8, the lobed ball 174 protrudes through the aperture 165 formed by seat 164 and below the bottom surface 166 of canopy 148. This is necessary to permit the ball 174 to pivot within seat 164 for a predetermined amount without the downrod 144 contacting canopy 148. This amount may vary with application, and the present invention is not limited by the particular distance that ball 174 protrudes below the bottom surface 66 of the lower end portion 154 of canopy 148. However, in one application, the ball 174 may protrude below the bottom surface 166 of canopy 148 by an amount to permit ball 174 to pivot sufficiently to accommodate a 34 degree slope of the ceiling to which canopy 148 is mounted. In any event, the outer surface 180 of the lobed ball 174 protrudes below the bottom surface of 166 of canopy 148 by a predetermined distance 282 shown in FIG. 16, and corresponding to the longitudinal position of the transverse plane shown in FIG. 19 from the lower end 178 of ball 174. The shape and size of the inner surface 170 of the seat 164 of canopy 148, at a lower end 171 of seat 164, is substantially the same as the shape and size of the outer surface 180 of the lobed ball at the predetermined distance 282 above the lower end 178 of ball 174, which corresponds to the shape and size of the outer surface 180 in the transverse plane illustrated in FIG. 19. In one embodiment, the predetermined distance 282 may be about 0.4 inches and the overall longitudinal height of ball 174 is about 1.0 inches. However, the predetermined distance 282 and the overall height of ball 174 may vary with application. In one embodiment, the lobed ball 174 is sized so that the upper end 176 of the lobed ball 174 extends above an upper end 173 of the canopy seat 164. In this instance, the inner surface 170 of canopy seat 164, at the upper end 173 of seat 164, contacts the outer surface 180 of ball 174 at a location which is spaced longitudinally above the lower end 178 of ball 174 by a predetermined distance 284. The distance 284 is shown in FIG. 16 and corresponds to the longitudinal position of the transverse plane shown in FIG. 20. The shape and size of surface 170 of seat 164, at the upper end 173 of seat 164, is substantially the same as the shape and size of the outer surface 180 of ball 174 shown in the transverse plane illustrated in FIG. 20, at the predetermined distance 284 above the lower end 178 of ball 174. In the illustrative embodiment, the predetermined distance 284 is about 0.8 inches. However, the magnitude of distance 284 may vary with application. It may be seen that the difference between distances 284 and 282 corresponds to the longitudinal height of the canopy seat 164. Accordingly, in the illustrative embodiment, the height of seat 164 is about 0.4 inches. The inner surface 170 of canopy seat 164 is blended smoothly between the upper 173 and lower 171 ends so as to substantially match the shape of the outer surface 180 of the lobed ball 174 between the transverse planes illustrated in FIGS. 19 and 20.

Figure 29:
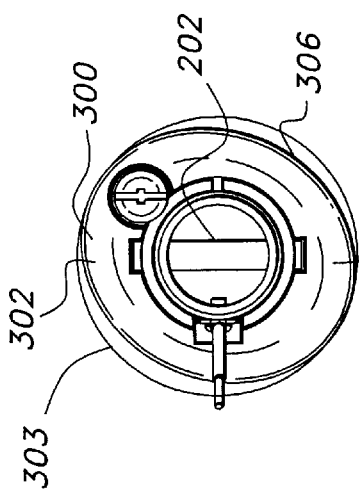
FIG. 29 is a top plan view of the lobed ball shown in FIG. 28.
Figure 28:
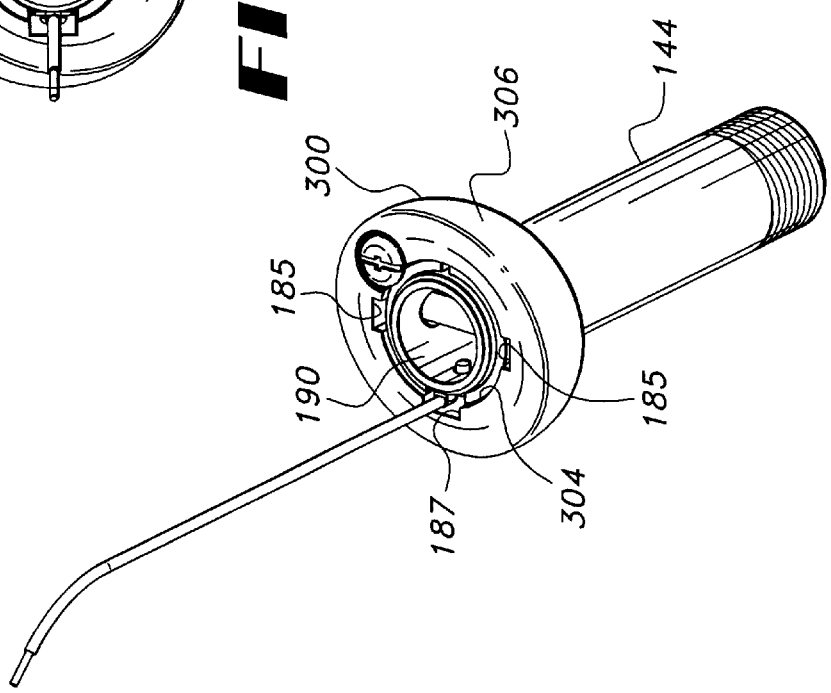
FIG. 28 is a perspective view illustrating a lobed ball according to an alternate embodiment of the present invention, with the ball connected to a ceiling fan downrod.

FIGS. 28 and 29 illustrate a lobed ball 300 according to an alternate embodiment of the present invention. The lobed ball 300 is the same as the lobed ball 174 described previously, except that the lobed ball 300 includes two lobes 302 which extend radially outwardly from an inner surface 304 to an outer surface 306 of ball 300. The two lobes 302 of ball 300 replace the three lobes 250 of ball 174. Each of the lobes 302 may be shaped identically to one of the lobes 250 of ball 174, as discussed previously. The remaining features of ball 174 are included in ball 300, such as the two slots 185 and slot 187, etc. Furthermore, as shown in FIG. 28, the ball 300 may be connected to the upper end portion 146 of the downrod 144 via the hollow sleeve 190 as discussed previously with regard to ball 174. A construction circle 303 has been added to FIG. 29, for purposes of facilitating the illustration of the two lobes 302.

Figure 30:
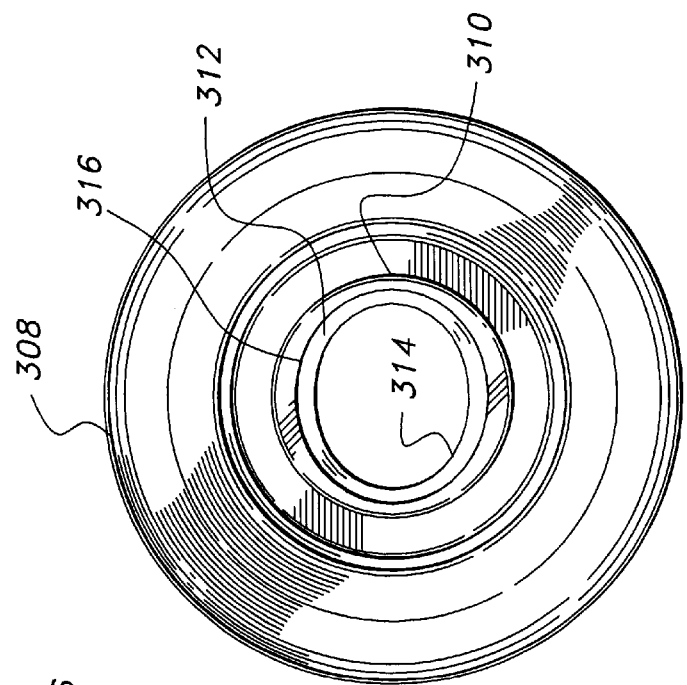
FIG. 30 is a top plan view illustrating a canopy according to an alternate embodiment of the present invention and corresponding to the lobed ball shown in FIGS. 28 and 29.

FIG. 30 is a top plan view illustrating a canopy 308 accordingly to an alternate embodiment of the present invention. Canopy 308 is the same as canopy 148 described previously except as follows, and is used with ball 300. Canopy 308 includes a seat 310 attached to and extending upwardly from a lower end of canopy 308. The seat 310 has an inner surface 312 having a shape and size which is complementary to the shape of the outer surface 306 of the dual-lobed ball 300. For instance, the shape and size of the inner surface 312, at a lower end 314 of seat 310, corresponds to the shape and size of the outer surface 306 of ball 300 as defined in a first transverse plane spaced above the lower end of the ball 300 by a first predetermined distance, as discussed previously with respect to ball 174 and seat 164. Also, the shape and size of the inner surface 312 of seat 310, at an upper end 316 of seat 310, has a shape and size which is substantially the same as that of the outer surface 306 of ball 300 as defined in a second transverse plane spaced above the lower end of ball 300 by a second predetermined distance, as discussed previously with respect to ball 174 and seat 164.

FIGS. 31 and 32 illustrate a lobed ball 330 according to a second alternate embodiment of the present invention. Lobed ball 330 is the same as lobed ball 174 except as follows. The lobed ball 330 includes a single lobe 332 which extends radially outwardly from an inner surface 334 to an outer surface 336 of the ball 330. A construction circle 333 is shown in FIG. 32 to facilitate the illustration of the single lobe 332. The lobe 332 has a shape which maybe the same as that of the lobes 250 described previously with respect to ball 174. The remaining features of ball 174, such as the two slots 185 and slot 187, etc., are included in ball 330. Furthermore, as shown in FIG. 31, ball 330 may be connected to the upper end 146 of downrod 144 via the hollow sleeve 190.

FIG. 32 is a top plan view illustrating a canopy 338 according to another alternate embodiment of the present invention. Canopy 338 is the same as canopy 148 discussed previously, except as follows, and is used with ball 330. Canopy 338 includes a seat 340 which is attached to and extends upwardly from the lower end of canopy 338. Seat 340 includes an inner surface 342 having a shape which is complementary to the shape of the outer surface 336 of the single lobed ball 330. As with the previous embodiments of the present invention, the shape and size of the inner surface 342 of seat 340 at a lower 344 and upper 346 end of seat 340, are substantially the same as the shape and size of the outer surface 336 of the lobed ball 330 as defined in first and second transverse planes spaced above a lower end of ball 330 by first and second predetermined distances, respectively.

The principles of the present invention have been illustrated with lobed balls and matching canopy seats having one, two or three radially outwardly extending lobes. However, it is considered to be within the scope of the present invention to use more than three lobes. For instance, it is considered to be within the scope of the present invention to use as many as eight lobes on both the ball and canopy seat (equal number of lobes on both) provided the shape of the inner surface of the canopy seat complements the shape of the outer surface of the lobed ball, with the ball being pivotable within the canopy seat about an axis which is perpendicular to the longitudinal centerline of the ball. At the present time it is felt that using more than eight lobes would not be desirable due to the increased manufacturing complexity and due to the increased chance of rotation of the ball within the canopy seat about the longitudinal centerline of the ball, which is undesirable, due to a lack of well defined lobes on both the ball and seat.

In operation, the lobed ball 174 is pivotally disposed within the seat 164 of canopy 148. Similarly, the lobed balls 300 and 330 are pivotally disposed within the canopy seats 310 and 340, respectively. In each embodiment, the inner and outer surfaces of the lobed ball define at least one lobe extending radially outwardly from the inner to the outer surface of the ball, with the outer surface having a lobed shaped in any plane passing transversely through the ball and perpendicular to the centerline axis of the ball. In each embodiment, the corresponding canopy seat has a shape which is complementary to the shape of the outer surface of the corresponding lobed ball so that the ball may pivot within the canopy seat to accommodate a sloped ceiling, while preventing rotation of the ceiling fan about the longitudinal centerline axis of the fan. Furthermore, in each embodiment, reaction of the torque of motor 112 does not result in the ceiling fan 100 being canted at an angle relative to vertical during operation. Instead, the centerline axis 186 of fan 100 remains substantially vertically oriented during the operation of the fan 100. This is true because in each embodiment the lobed ball pivots within the corresponding canopy seat about an axis which is substantially perpendicular to the centerline axis of the ball and the centerline axis of the ceiling fan which are coincident when the ball is installed. Furthermore, the pivot axis of the ball moves with the ball, unlike pivot axis EF of the conventional suspension system illustrated in FIGS. 1–7. The foregoing features of the present invention are further illustrated in FIGS. 34–37 with respect to the tri-lobed ball 174 and matching canopy seat 164.

Figure 34:
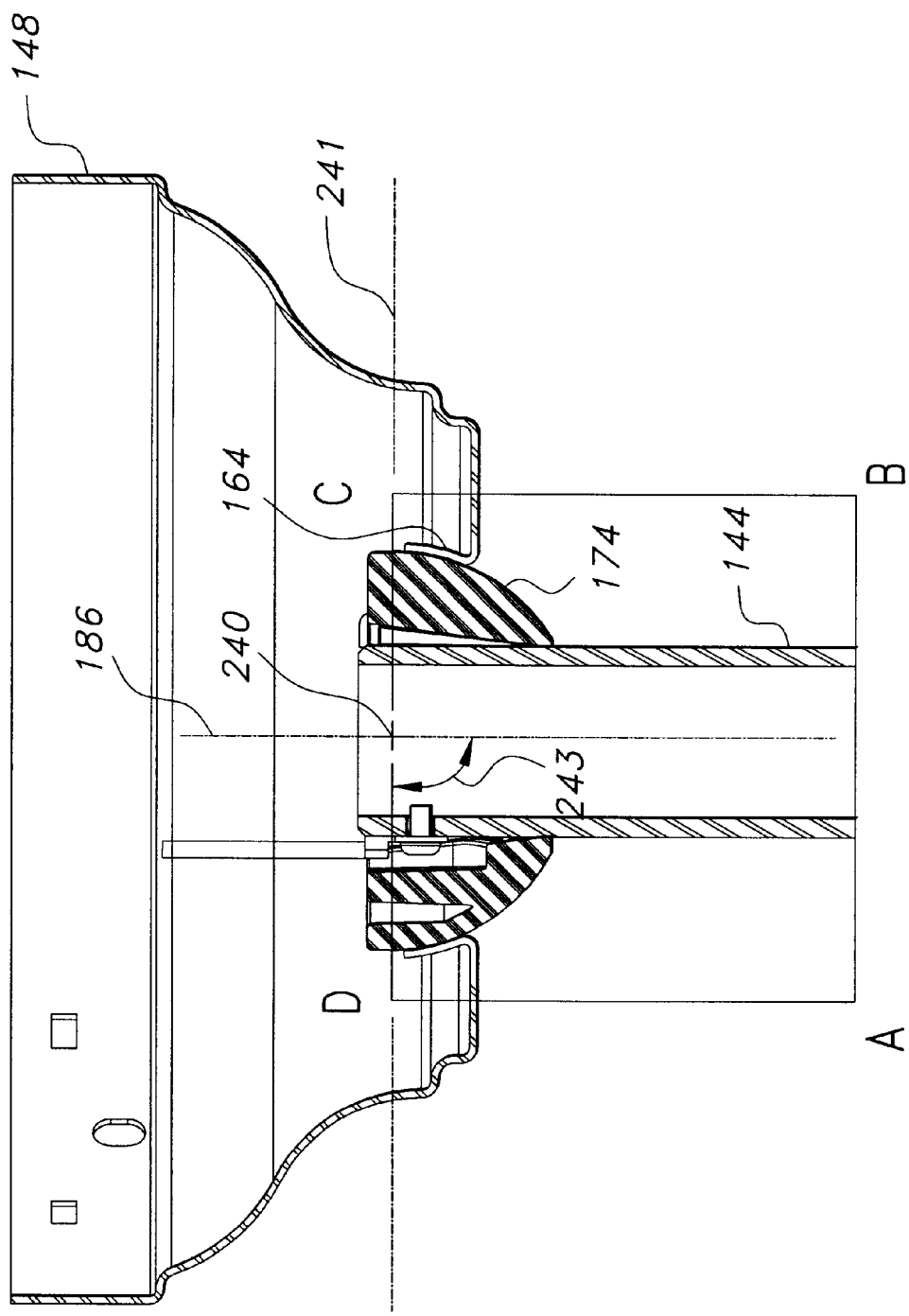
FIG. 34 is a fragmentary elevation view, partially in cross-section, further illustrating the suspension system of the present invention illustrated in FIGS. 8–27.
Figure 35:
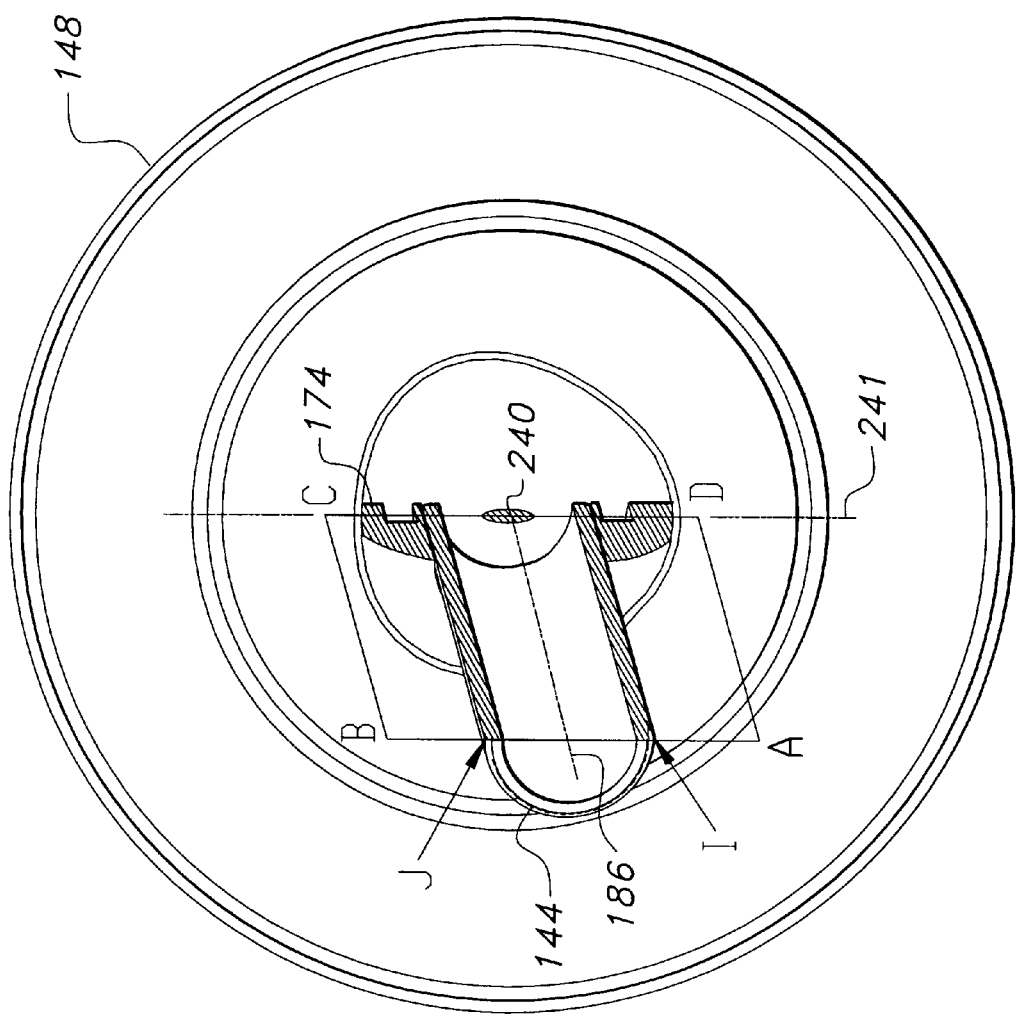
FIGS. 35–37 are a series of bottom plan views of the system shown in FIG. 34, illustrating various possible positions of the ball included in the system and the ceiling fan downrod attached to the ball.
Figure 36:
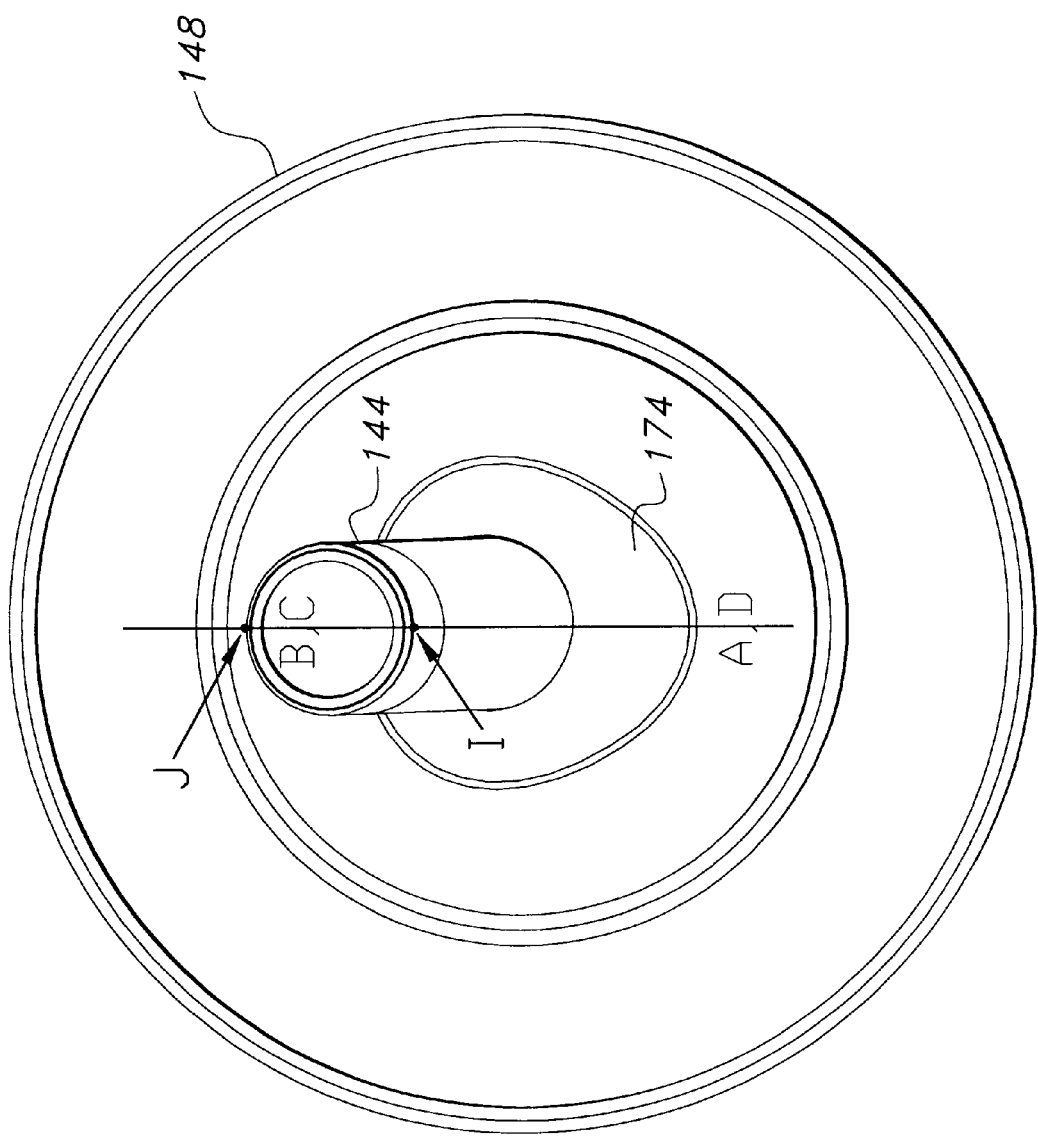
Figure 37:
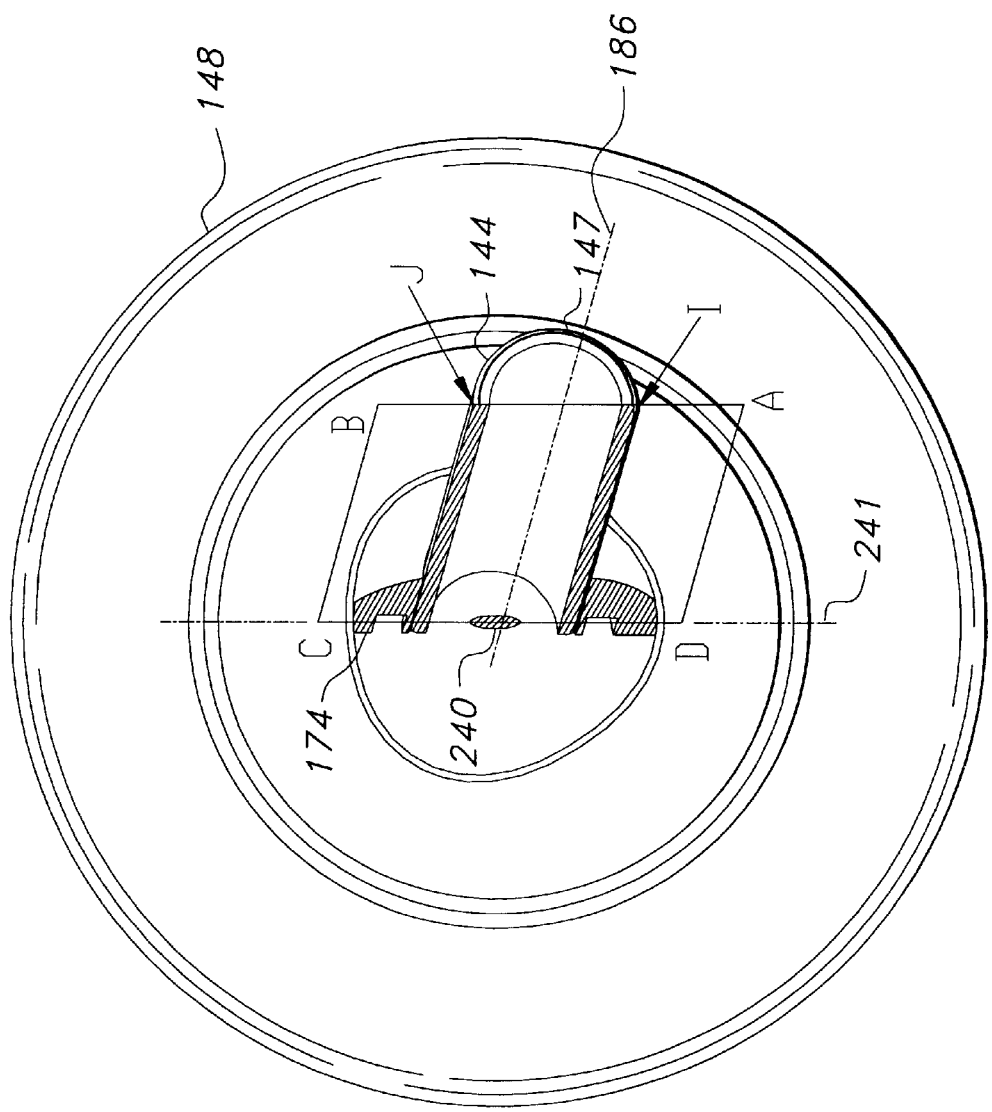

As best seen in FIG. 34, the pivot axis 241 of ball 174 is substantially perpendicular to the longitudinal centerline axis 186 of ceiling fan 100, i.e., angle 243 is substantially 90 degrees, and axis 241 is also substantially perpendicular to the longitudinal centerline axis 175 of ball 174 since axis 175 is coincident with axis 186 when ball 174 is installed in canopy seat 164. Also, as shown in FIGS. 34, 35 and 37, axis 241 passes through the center of rotation 240 of ball 174. A plane ABCD is illustrated in FIGS. 34–37 which passes longitudinally through the center of downrod 144 and intersects the pivoting axis 241 of ball 174. Both axis 241 and the centerline axis 186 of ceiling fan 100 lie in plane ABCD. Plane ABCD intersects the outer surface of the lower end 147 of downrod 144 at points I and J as shown in FIGS. 35–37, which illustrate the ball 174 in various positions relative to the canopy seat 164. The positions illustrated in FIGS. 35–37 correspond generally to those shown in FIGS. 5–7 for conventional ball 24 and seat 30 of canopy 18 for purposes of comparison. As shown in FIGS. 35–37, a line between points I and J, which may be referred to as line IJ, remains substantially parallel to axis 241 as ball 174 pivots within seat 164. Accordingly, there is no lateral displacement of points I and J as ball 174 pivots, i.e., dimensions "X" and "Y" shown in FIGS. 5 and 7 for conventional ball 24 do not exist with regard to ball 174. Accordingly, points I and J may remain in a substantially vertically disposed plane as ball 174 pivots as required for canopy 148 to accommodate a sloped ceiling and axis 186 of fan 100 is not canted relative to vertical due to the reaction of the torque of motor 112 of fan 100.

Utilization of one of the suspension systems of the present invention results in smoother operation of the ceiling fan since the cyclical jerking of the fan, due to the reaction of the combination of fan motor torque and imbalance forces, experienced by fans using conventional ceiling fan suspension systems, is eliminated. Furthermore, the magnitude of the fan wobble pattern is significantly reduced relative to that which exists when using conventional ceiling fan suspension systems.

Figure 38:
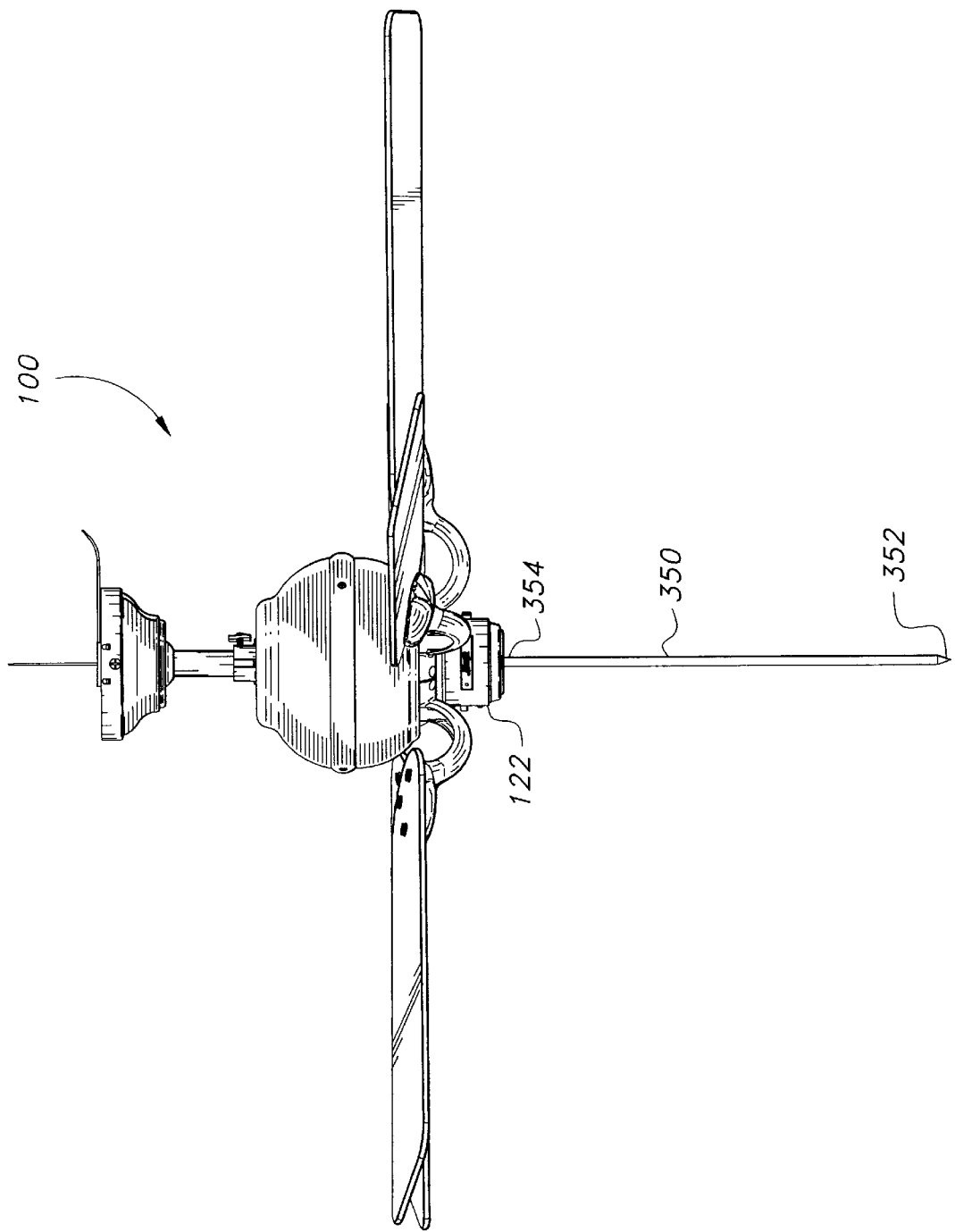
FIG. 38 is an elevation view of a ceiling fan illustrating a test setup used to determine fan wobble.

The advantages which may be realized by suspending a ceiling fan with one of the systems according to the present invention is graphically illustrated with reference to FIGS. 38 and 39. FIG. 38 illustrates a test setup using the ceiling fan 100 shown in FIG. 8, with the light fixture 126 removed. The ceiling fan 100 was suspended from a support structure (not shown) using the system 110 of the present invention, as described previously. A gauge rod 350 having a pointed lower end 352 was attached at an upper end 354 to the switch housing 122 of ceiling fan 100. Ceiling fan 100 was then operated, in both updraft and downdraft directions, with the wobble patterns being described by the lower end 352 of gauge rod 350. The lower end 352 of rod 350 scribed first 356 and second 357 wobble patterns on a target 358 as illustrated in the plan view shown in FIG. 35, corresponding to the wobble patterns of fan 100 operated in the downdraft and updraft directions, respectively. As shown in FIG. 35, both wobble patterns 356 and 357 have a generally circular shape which is smaller than a circle having a radius of 0.25 inches.

The test was repeated with the suspension system 110 of the present invention being replaced by the conventional suspension system discussed in conjunction with FIGS. 1–7 of this document. With this configuration, the lower end 352 of gauge rod 350 scribed a third wobble pattern 360, with the ceiling fan operating in a downdraft direction, and a fourth wobble pattern 370, with the ceiling fan operating in an updraft direction. As shown in FIG. 39, the wobble patterns 360 and 370 have generally elliptical shapes which are substantially the same, with both patterns 360 and 370 being substantially larger than wobble patterns 356 and 357. For instance, as shown in FIG. 39, wobble pattern 360 is characterized by a first dimension 362, corresponding generally to the major axis of the generally elliptical pattern 360, and is further characterized by a second dimension 364, corresponding generally to the minor axis of pattern 360. Dimensions 362 and 364 were measured to be about 1.9 inches and about 1.09 inches, respectively. Additionally, the centers of both of the elliptically shaped wobble patterns 360 and 370 are displaced from a center 366 of target 358 by approximately the same distance. For instance, the center of pattern 360 is displaced by a distance 368 of about 1.4 inches. This indicates that the centerline of the ceiling fan was canted relative to vertical during operation. In contrast, as shown in FIG. 35, the wobble patterns 356 and 357 have a center which substantially coincides with the center 366 of target 358, indicating that the centerline 186 of fan 100 remained substantially vertically disposed during the operation of fan 100 when using the suspension system 110 according to the present invention.

While the foregoing description has set forth the preferred embodiments of the present invention, in particular detail, it must be understood that numerous modifications, substitutions and changes can be undertaken without departing from the true spirit and scope of the present invention as defined by the ensuing claims. For instance, each of the lobed balls may be directly connected to the downrod 144 of the ceiling fan 100, or to a similar structure. In this instance, the inner surfaces of the lobed balls may be threaded, so that each of the lobed balls may be threaded onto the upper end portion 146 of the downrod 144 of ceiling fan 100, or to a similar structure of another ceiling fan. Also, while the principals of the present invention have been illustrated with lobed balls and canopy seats having the illustrated and described shapes, it should be understood that the particular shapes of the lobes of the lobed ball and canopy seat may vary widely within the scope of the present invention provided that the shapes of the outer surface of the lobed ball and the inner surface of the canopy seat complement one another and further provided that the ball pivots about an axis which moves with the ball and remains substantially perpendicular to the longitudinal centerline axis of the ceiling fan. The invention is, therefore, not limited to a specific preferred embodiment as described, but is only limited as defined by the following claims.

What is claimed is:

1. A system for suspending a ceiling fan having a longitudinal centerline axis, the ceiling fan further including a motor having a rotor and a stator, and a plurality of fan blades connected to the rotor, said system comprising:

a hollow canopy defining an interior space, said canopy including an upper end portion which is operatively attachable to a support structure and a lower end portion having a bottom surface, said canopy further including a seat connected to said lower end portion and extending upwardly from said lower end portion within said interior space, said seat having upper and lower ends, an outer surface and an inner surface having a shape and defining an aperture extending through said seat and through said bottom surface of said lower end portion;

a ball pivotally engaged with said seat of said canopy and connectable to a stationary portion of the ceiling fan for the purpose of suspending the ceiling fan, the ball including upper and lower ends, an inner surface and a smoothly changing, non-spherical outer surface, said inner and outer surfaces defining an annular wall extending between said upper and lower ends, said outer surface engaging said inner surface of said seat of said canopy;

said outer surface of said ball having a shape which is complementary to said shape of said inner surface of said seat of said canopy, said outer surface of said ball and said inner surface of said seat operatively interacting with one another to allow said ball and the ceiling fan to pivot about an axis passing through said ball which is substantially perpendicular to the longitudinal centerline axis of the ceiling fan, and to prevent the ceiling fan from rotating about the longitudinal centerline axis of the ceiling fan.

2. A system for suspending a ceiling fan having a longitudinal centerline axis, the ceiling fan further including a motor having a rotor and a stator, and a plurality of fan blades connected to the rotor, said system comprising:

a hollow canopy defining an interior space, said canopy including an upper end portion which is operatively attachable to a support structure and a lower end portion having a bottom surface, said canopy further including a seat connected to said lower end portion and extending upwardly from said lower end portion within said interior space, said seat having upper and lower ends, an outer surface and inner an surface having a shape and defining an aperture extending through said seat and through said bottom surface of said lower end portion, said seat of said canopy comprising a lobed seat including at least one lobe defined by said inner and outer surfaces and extending radially outwardly from said inner surface to said outer surface;

a ball pivotally engaged with said seat of said canopy and connectable to a stationary portion of the ceiling fan for the purpose of suspending the ceiling fan, the ball including upper and lower ends, and inner and outer surfaces which define an annular wall extending between said upper and lower ends, said outer surface engaging said inner surface of said seat of said canopy, said outer surface of said ball having a shape which is complementary to said shape of said inner surface of said seat of said canopy, wherein said ball comprises a lobed ball including at least one lobe defined by said inner and outer surfaces of said lobed ball and extending radially outwardly from said inner surface of said lobed ball to said outer surface of said lobed ball;

said at least one lobe of said lobed seat and said at least one lobe of said lobed ball operatively interact with one another to permit said lobed ball and the ceiling fan to pivot about an axis passing through said lobed ball which is substantially perpendicular to the longitudinal centerline axis of the ceiling fan, and to prevent the ceiling fan from rotating about the longitudinal centerline axis of the ceiling fan.

3. The system recited in claim 2, wherein:

said lobed seat includes three of said lobes extending radially outwardly from said inner surface of said to said outer surface of said seat, each of said lobes of said seat being equally spaced circumferentially from one another;

said lobed ball includes three of said lobes extending radially outwardly from said inner surface of said lobed ball to said outer surface of said lobed ball, said lobes of said lobed ball being equally spaced circumferentially from one another.

4. The system as recited in claim 2, wherein:

said lobed seat includes two of said lobes extending radially outwardly from said inner surface of said lobed ball to said outer surface of said lobed ball;

said lobed ball includes two of said lobes extending radially outwardly from said inner surface of said lobed ball to said outer surface of said lobed ball.

5. The system as recited in claim 2, wherein:

said lobed seat includes one of said lobes extending radially outwardly from said inner surface of said seat to said outer surface of said seat;

said lobed ball includes one of said lobes extending radially outwardly from said inner surface of said lobed ball to said outer surface of said lobed ball.

6. The system as recited in claim 3, wherein:

said radially outwardly extending lobes of said ball extend longitudinally form said upper end to said lower end of said lobed ball.

7. The system as recited in claim 3, wherein:

said lobed ball has an annular, tri-lobed, transverse cross-sectional shape defined by said inner and outer surfaces of said lobed ball.

8. The system as recited in claim 7, wherein:

said annular, tri-lobed, transverse cross-sectional shape of said lobed ball has a first size at said upper end of said lobed ball and a second size at said lower end of said lobed ball, said first size being greater than said second size;

said annular, tri-lobed, transverse cross-sectional shape of said lobed ball extends longitudinally from said upper end to said lower end of said ball.

9. The system as recited in claim 7, wherein:

said lobed ball includes a longitudinal centerline axis;

said inner surface of said lobed ball has a frustoconical shape;

said shape of said outer surface comprises a tri-lobed shape in a first plane which passes transversely through said lobed ball and perpendicular to said longitudinal centerline axis of said ball.

10. The system as recited in claim 9, wherein:

said shape of said outer surface comprises an arcuate shape in a second plane which passes longitudinally through said lobed ball, from said upper end to said lower end, parallel to said longitudinal centerline axis of said ball.

11. The system as recited in claim 9, wherein:

each of said lobes of said lobed ball is defined in said first plane by a first radially outermost point on said outer surface within said first plane and positioned by a first radius extending in said first plane from said centerline axis of said ball to said first radially outermost point;

each of said lobes is further defined within said first plane by a second point on said outer surface and positioned clockwise circumferentially from said first, radially outermost point and a third point on said outer surface and positioned counterclockwise from said first, radially outermost point;

said second and third points of each of said lobes being defined by second and third radii extending in said first plane from said centerline axis of said lobed ball to said second and third points, respectively, on said outer surface, said second radius being the same as said third radius, said second and third radii being less than said first radius whereby said second and third points each comprise a radially innermost point of said lobe within said first plane;

said lobes being further defined within said first plane by first and second arcuate and continuous lines extending between said first and second points and between said first and third points, respectively, within said first plane;

each of said lobes being further defined within said first plane by an arcuate line described by a fourth radius extending from said centerline axis of said lobed ball to said inner surface of said lobed ball, said arcuate line extending throughout an arc subtended by said second and third radii;

each of said lobes being further defined within said first plane by first and second radial lines extending between said inner and outer surfaces of said lobed ball and intersecting said second and third points, respectively, on said outer surface.

12. The system as recited in claim 11, wherein:

said first, radially outermost points of said lobes are spaced about 120 degrees from one another.

13. The system as recited in claim 12, wherein:

said second and third points of each of said lobes are spaced about 60 degrees from said first point of the corresponding one of said lobes of said lobed ball.

14. The system as recited in claim 13, wherein:

said second point of said one of said lobes comprises said third point of a clockwise-adjacent one of said lobes;

said third point of said one of said lobes comprises said second point of a counterclockwise-adjacent one of said lobes.

15. The system as recited in claim 3, wherein the ceiling fan further includes a downrod having an upper end and a lower end connected to the stationary portion of the ceiling fan, said system further comprising:

a hollow sleeve having open upper and lower ends, said sleeve being disposed in surrounding relationship with and connected to the upper end of the downrod, said sleeve having a substantially cylindrical inner surface and a tapered outer surface; wherein said lobed ball is disposed in surrounding and contacting relationship with said sleeve, said inner surface of said lobed ball defining an aperture extending through said lobed ball which is effective for receiving said sleeve, said inner surface being configured to frictionally engage said tapered outer surface of said sleeve.

16. The system as recited in claim 15, wherein:

said inner surface of said lobed ball and said outer surface of said hollow sleeve are tapered radially outwardly between said lower and upper ends of said lobed ball and said hollow sleeve, respectively.

17. The system as recited in claim 16, wherein:

said lobed ball includes a longitudinal centerline axis;

said inner surface of said lobed ball has a radially outward taper extending from said lower to said upper end of said ball, ranging from about 1.0 degrees to about 15.0 degrees relative to said longitudinal centerline axis.

18. The system as recited in claim 16, wherein:

said taper of said inner surface of said lobed ball is about 7.0 degrees.

19. The system as recited in claim 17, wherein:

said hollow sleeve includes a longitudinal centerline axis;

said outer surface of said hollow sleeve has a radially outward taper extending from said lower to said upper end of said sleeve, ranging from about 1.0 degrees to about 15.0 degrees relative to said longitudinal centerline axis of said sleeve.

20. The system as recited in claim 19, wherein:

said taper of said outer surface of said hollow sleeve is about 7.0 degrees.

21. The system as recited in claim 3, wherein:

said lobed ball is made of a nylon material.

22. The system as recited in claim 15, wherein the upper end of the downrod of the ceiling fan includes a pair of diametrically opposed holes extending radially therethrough, said system further comprising:

a pin effective for connecting said hollow sleeve to the upper end of the downrod; wherein said inner and outer surfaces of said hollow sleeve define a wall extending therebetween;

said hollow sleeve includes a pair of diametrically opposed apertures extending through said wall;

said sleeve is positioned so that said apertures in said sleeve are aligned with the holes in the upper end of the downrod and said pin is inserted through said apertures in said hollow sleeve and the aligned holes in the upper end of the downrod, thereby connecting the hollow sleeve to the downrod.

23. The system as recited in claim 22, wherein:

said lobed ball includes a pair of diametrically opposed slots formed in said annular wall of said ball and extending longitudinally from said upper end of said ball toward said lower end;

each of said slots being effective for receiving an end of said pin thereby permitting said lobed ball to translate longitudinally relative to the downrod.

24. The system as recited in claim 23, wherein:

said hollow sleeve includes a slit which extends through said wall and longitudinally from said lower end of said sleeve to and through said upper end of said sleeve thereby subdividing said sleeve into first and second circumferentially extending portions and permitting said sleeve to conform to the upper end of the downrod.

25. The system as recited in claim 23, wherein:

said sleeve comprises a plurality of relief notches extending through said wall, said notches extending longitudinally from one of said ends of said sleeve and toward the other of said ends of said sleeve, said notches facilitating circumferential compression of said sleeve.

26. The system as recited in claim 23, wherein:

said sleeve includes a generally U-shaped relief notch extending through said wall and longitudinally from said upper end of said sleeve toward said lower end of said sleeve, said notch being spaced apart longitudinally from said lower end of said sleeve;

said lobed ball includes a third slot formed in said annular wall and extending from said upper end of said lobed ball toward said lower end of said lobed ball;

said generally U-shaped relief notch of said sleeve is aligned with said third slot in said lobed ball, whereby said generally U-shaped notch and said third slot are effective for receiving a means for grounding the ceiling fan, the means for grounding being attached to the upper end of the downrod.

27. The system as recited in claim 22, further comprising;

a fastener threaded into said upper end of said lobed ball;

said fastener including a head disposed in a recess formed in said upper end of said lobed ball;

said head being sized so it radially overlaps said upper end of said hollow sleeve thereby preventing said hollow sleeve from passing through said upper end of said lobed ball.

28. The system as recited in claim 1, wherein:

said canopy further includes a central, body portion extending between said upper end portion and said lower end portion;

said seat of said canopy is integrally formed with said upper end portion, said lower end portion and said central, body portion of said canopy.

29. The system as recited in claim 28, wherein:

said canopy is made of a material selected from the group consisting of metals and metallic alloys.

30. The system as recited in claim 1, wherein:

said canopy further includes a central, body portion extending between said upper end portion and said lower end portion;

said seat of said canopy is manufactured separately from said upper end portion, said lower end portion and said central, body portion, and is then attached to said lower end portion.

31. The system as recited in claim 30, wherein:

said upper end portion, said lower end portion and said central body portion of said canopy are made from a material selected from the group consisting of metals and metallic alloys.

32. The system as recited in claim 31, wherein:

said seat of said canopy is made from a molded plastic material.

33. The system as recited in claim 32, wherein:

said seat of said canopy is bonded to said lower end portion of said canopy.

34. A hollow sleeve for use in a system for suspending a ceiling fan having a motor and a stator, the ceiling fan further including a plurality of fan blades connected to the rotor and a downrod connected to the stator, said sleeve comprising:

a longitudinal centerline axis;

open upper and lower ends;

a substantially cylindrical inner surface operatively effective for engaging an upper end of the downrod;

a tapered outer surface, said inner and outer surfaces defining a wall extending between said upper and lower ends;

said tapered outer surface having a radially outward taper extending from said lower to said upper end of said sleeve, said taper ranging from about 1.0 degrees to about 15.0 degrees relative to said longitudinal centerline axis of said sleeve.

35. A system for suspending a ceiling fan having a longitudinal centerline axis, said system comprising:

a hollow canopy defining an interior space, said canopy including an upper end portion which is operatively attachable to a support structure and a lower end portion having a bottom surface, said canopy further including a seat connected to said lower end portion and extending from said lower end portion, said seat having an inner surface having a shape and defining an aperture extending through said seat and through said bottom surface of said lower end portion;

a ball pivotally engaged with said seat of said canopy and connectable to a stationary portion of the ceiling fan for the purpose of suspending the ceiling fan, the ball including an inner surface and a smoothly changing, non-spherical outer surface, said inner and outer surfaces defining an annular wall extending between said upper and lower ends, said outer surface engaging said inner surface of said seat of said canopy;

said outer surface of said ball having a shape which is complementary to said shape of said inner surface of said seat of said canopy, said smoothly changing, non-spherical outer surface of said ball and said inner surface of said seat operatively interacting with one another to allow said ball and the ceiling fan to pivot about an axis passing through said ball which is substantially perpendicular to the longitudinal centerline axis of the ceiling fan, and to prevent the ceiling from rotating about the longitudinal centerline axis of the ceiling fans.

36. The system as recited in claim 35, wherein:

said ball comprises a lobed ball including at least one lobe defined by said inner surface and said smoothly changing, non-spherical outer surface of said lobed ball and extending radially outwardly from said inner surface of said lobed ball to said smoothly changing, non-spherical outer surface of said lobed ball.

37. The system as recited in claim 36 wherein:

said lobed ball includes a longitudinal centerline axis;

said smoothly changing, non-spherical outer surface of said lobed ball has a lobed shape in a first plane which passes transversely through said lobed ball and perpendicular to said longitudinal centerline axis of said lobed ball.

38. The system as recited in claim 37, wherein:

said lobed ball includes upper and lower ends;

said smoothly changing, non-spherical outer surface of said lobed ball comprises an arcuate shape in a second plane which passes longitudinally through said lobed ball, from said upper end to said lower end, parallel to said longitudinal centerline axis.

39. The system as recited in claim 36, wherein:

said seat of said canopy includes an outer surface and comprises a lobed seat including at least one lobe defined by said inner and outer surfaces and extending radially outwardly from said inner surface to said outer surface;

said at least one lobe of said lobed seat and said at least one lobe of said lobed ball operatively interact with one another to permit said lobed ball and the ceiling fan to pivot about said axis passing through said lobed ball which is substantially perpendicular to the longitudinal centerline axis of the ceiling fan, and to prevent the ceiling fan from rotating about the longitudinal centerline axis of the ceiling fan.

40. The system as recited in claim 39, wherein:

said lobed seat includes three of said lobes extending radially outwardly from said inner surface of said seat to said outer surface of said seat, each of said lobes of said seat being substantially equally spaced circumferentially from one another;

said lobed ball includes three of said lobes extending radially outwardly from said inner surface of said lobed ball to said smoothly changing, non-spherical outer surface of said lobed ball, said lobes of said lobed ball being substantially equally spaced circumferentially from one another.

41. The system as recited in claim 35, wherein:

said inner surface of said seat of said canopy comprises a smoothly changing, non-spherical surface.

42. The system as recited in claim 35, further comprising:

a hollow sleeve having open upper and lower ends, said sleeve being disposable in surrounding relationship with and connectable to the stationary portion of the ceiling fan, said sleeve having a substantially cylindrical inner surface and a tapered outer surface; wherein said lobed ball is disposed in surrounding and contacting relationship with said sleeve, said inner surface of said lobed ball defining an aperture extending through said lobed ball which is effective for receiving said sleeve, said inner surface of said lobed ball being configured to frictionally engage said tapered outer surface of said sleeve.

43. The system as recited in claim 42, wherein:

said inner surface of said lobed ball and said outer surface of said hollow sleeve are tapered radially outwardly between said lower and upper ends of said lobed ball and said hollow sleeve, respectively.

44. The system as recited in claim 43, wherein:

said lobed ball includes a longitudinal centerline axis;

said inner surface of said lobed ball has a radially outward taper extending from said lower to said upper end of said ball, ranging from about 1.0 degrees to about 15.0 degrees relative to said longitudinal centerline axis of said lobed ball;

said hollow sleeve includes a longitudinal centerline axis;

said outer surface of said hollow sleeve has a radially outward taper extending from said lower to said upper end of said sleeve, ranging from about 1.0 degrees to about 15.0 degrees relative to said longitudinal centerline axis of said sleeve.

\* \* \* \* \*